US010600197B2

United States Patent
Hong et al.

(10) Patent No.: US 10,600,197 B2
(45) Date of Patent: Mar. 24, 2020

(54) ELECTRONIC DEVICE AND METHOD FOR RECOGNIZING OBJECT BY USING PLURALITY OF SENSORS

(71) Applicant: Samsung Electronics Co., Ltd., Suwon-si, Gyeonggi-do (KR)

(72) Inventors: Hyun-seok Hong, Suwon-si (KR); Sahng-gyu Park, Seongnam-si (KR); Bo-seok Moon, Gunpo-si (KR); Hae-in Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 15/840,424

(22) Filed: Dec. 13, 2017

(65) Prior Publication Data

US 2018/0165829 A1    Jun. 14, 2018

(30) Foreign Application Priority Data

Dec. 14, 2016 (KR) .................. 10-2016-0170404

(51) Int. Cl.
*G06T 7/70* (2017.01)
*G06K 9/62* (2006.01)
(Continued)

(52) U.S. Cl.
CPC .......... *G06T 7/70* (2017.01); *B60R 1/00* (2013.01); *G06F 16/00* (2019.01); *G06F 16/51* (2019.01);
(Continued)

(58) Field of Classification Search
CPC ............ G06T 7/70; G06T 2207/10016; G06T 2207/30196; G06T 7/143;
(Continued)

(56) References Cited

U.S. PATENT DOCUMENTS 5,063,603 A * 11/1991 Burt .................. G06K 9/00255
382/115
9,727,800 B2 * 8/2017 Pan .......................... G06K 9/34
(Continued)

FOREIGN PATENT DOCUMENTS

JP    2005-157906 A    6/2005
JP    2012-141740 A    7/2012
(Continued)

OTHER PUBLICATIONS

Heo Jingu:"Fusion of Visual and Thermal Face Recognition Techniques: A Comparative Study Acknowledgements", Oct. 2003 (Oct. 2003), XP055619040,Retrieved from the Internet: URL:https://pdfs.semanticscholar.org/e989/.
(Continued)

*Primary Examiner* — Jingge Wu
(74) *Attorney, Agent, or Firm* — Jefferson IP Law, LLP

(57) ABSTRACT

A method of recognizing an object, and a device therefor are provided. The method includes obtaining first sensing data from a first sensor that senses the object, obtaining second sensing data from a second sensor that senses the object, obtaining a first object recognition reliability for the object and a second object recognition reliability for the object respectively based on the first sensing data and the second sensing data, based on the first object recognition reliability and the second object recognition reliability, matching object information of the object recognized using the second sensing data to the first sensing data, and storing the matched object information in a database of one of the first sensor and the second sensor.

21 Claims, 22 Drawing Sheets

(51) Int. Cl.
*H04N 5/247* (2006.01)
*G06F 16/51* (2019.01)
*G06K 9/00* (2006.01)
*G06F 16/00* (2019.01)
*B60R 1/00* (2006.01)

(52) U.S. Cl.
CPC ....... *G06K 9/00805* (2013.01); *G06K 9/6202* (2013.01); *G06K 9/6255* (2013.01); *G06K 9/6293* (2013.01); *H04N 5/247* (2013.01); *B60R 2300/307* (2013.01)

(58) Field of Classification Search
CPC . G06T 2207/10021; G06T 2207/20081; G06T 2207/30232; G06T 7/77; G06T 2207/20084; G06T 2207/30252; G06T 2207/30256; G06K 9/00664; G06K 9/00798; G06K 9/6201; G06K 9/00805; G06K 9/3233; G06K 9/00228; G06K 9/3241; G06K 9/6202; G06F 16/51; G06F 16/00; B60R 1/00
See application file for complete search history.

(56) References Cited

U.S. PATENT DOCUMENTS

| | | | | |
|---|---|---|---|---|
| 2001/0040924 A1* | 11/2001 | Hori | .......... | G06T 7/246 375/240.16 |
| 2002/0001398 A1* | 1/2002 | Shimano | .............. | G06K 9/6293 382/104 |
| 2002/0168100 A1* | 11/2002 | Woodall | .................... | G06K 9/66 382/156 |
| 2008/0056535 A1* | 3/2008 | Bergmann | .............. | G01C 21/30 382/103 |
| 2008/0158409 A1* | 7/2008 | Gotanda | ............ | G06K 9/00255 348/348 |
| 2009/0228204 A1* | 9/2009 | Zavoli | .................... | G01C 21/30 701/532 |
| 2009/0262981 A1* | 10/2009 | Ike | ...................... | G06K 9/3233 382/103 |
| 2011/0007940 A1* | 1/2011 | Hamza | ................. | G06K 9/0063 382/103 |
| 2012/0008830 A1* | 1/2012 | Yoshii | ...................... | G06T 7/74 382/103 |
| 2012/0271483 A1* | 10/2012 | Samukawa | ........... | B60W 50/14 701/1 |
| 2013/0308856 A1* | 11/2013 | Carpenter | .......... | G06K 9/00335 382/164 |
| 2015/0003680 A1 | 1/2015 | Umeda et al. | | |
| 2015/0063648 A1* | 3/2015 | Minemura | ........... | G06K 9/6217 382/104 |
| 2015/0278579 A1* | 10/2015 | Saklatvala | ........... | G06K 9/6201 382/203 |
| 2015/0336547 A1* | 11/2015 | Dagan | ....................... | B60T 7/22 701/70 |
| 2016/0026879 A1* | 1/2016 | Maeda | ............... | G06K 9/00798 382/104 |
| 2016/0171339 A1* | 6/2016 | Choi | .................... | G06K 9/6293 382/103 |
| 2017/0067738 A1* | 3/2017 | Kim | ......................... | G01C 3/08 |
| 2017/0103524 A1* | 4/2017 | Franz | .................... | G06T 7/0012 |
| 2017/0193296 A1* | 7/2017 | Duong | ................. | G06K 9/4671 |
| 2018/0121755 A1* | 5/2018 | Yun | ..................... | G06K 9/2054 |
| 2018/0144493 A1* | 5/2018 | Mulukutla | ................ | G06T 7/62 |
| 2018/0159988 A1* | 6/2018 | Kashimura | ........ | G06K 9/00449 |
| 2018/0165828 A1* | 6/2018 | Sasatani | .................... | G06T 7/70 |
| 2018/0181818 A1* | 6/2018 | Shimotani | ............... | G01S 7/412 |
| 2018/0205875 A1* | 7/2018 | Nakamaru | ................ | G02B 7/28 |
| 2018/0299963 A1* | 10/2018 | Fukazawa | ................. | G06F 3/16 |

FOREIGN PATENT DOCUMENTS

| | | |
|---|---|---|
| JP | 20150068550 A * | 6/2015 |
| KR | 10-2015-0068550 A | 6/2015 |
| KR | 10-1607912 B1 | 3/2016 |
| WO | 2009/111498 A2 | 9/2009 |

OTHER PUBLICATIONS

Extended European Search Report dated Sep. 12, 2019, issued in European Application No. 17880707.9.

* cited by examiner

FIG. 1
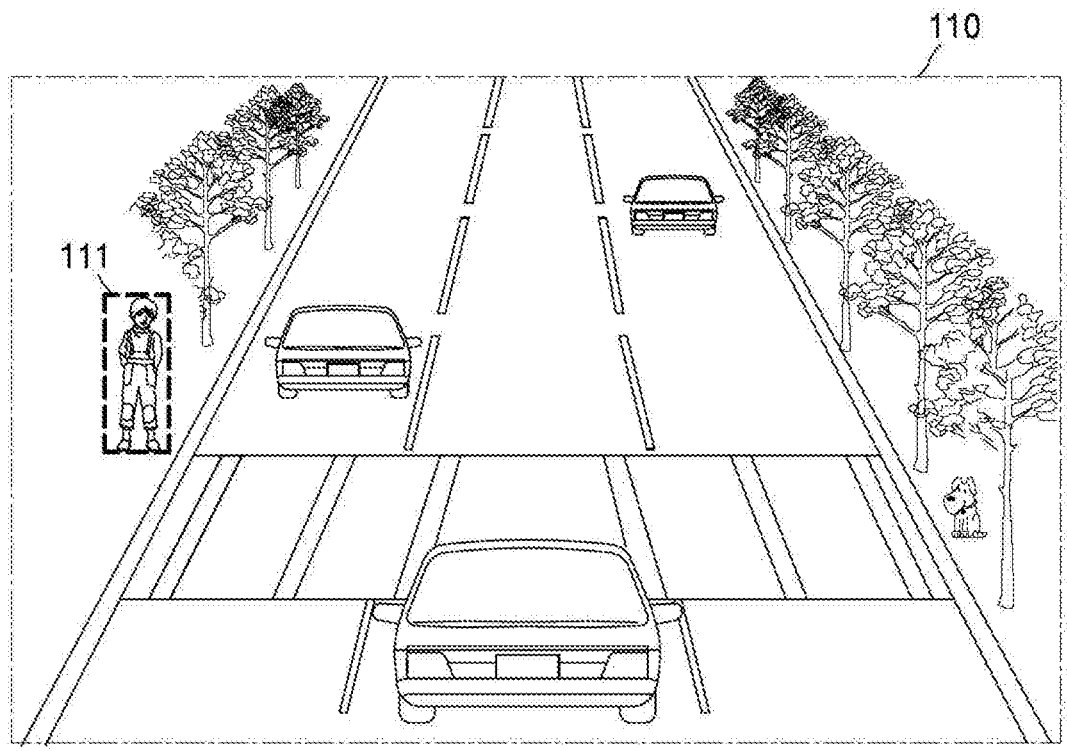
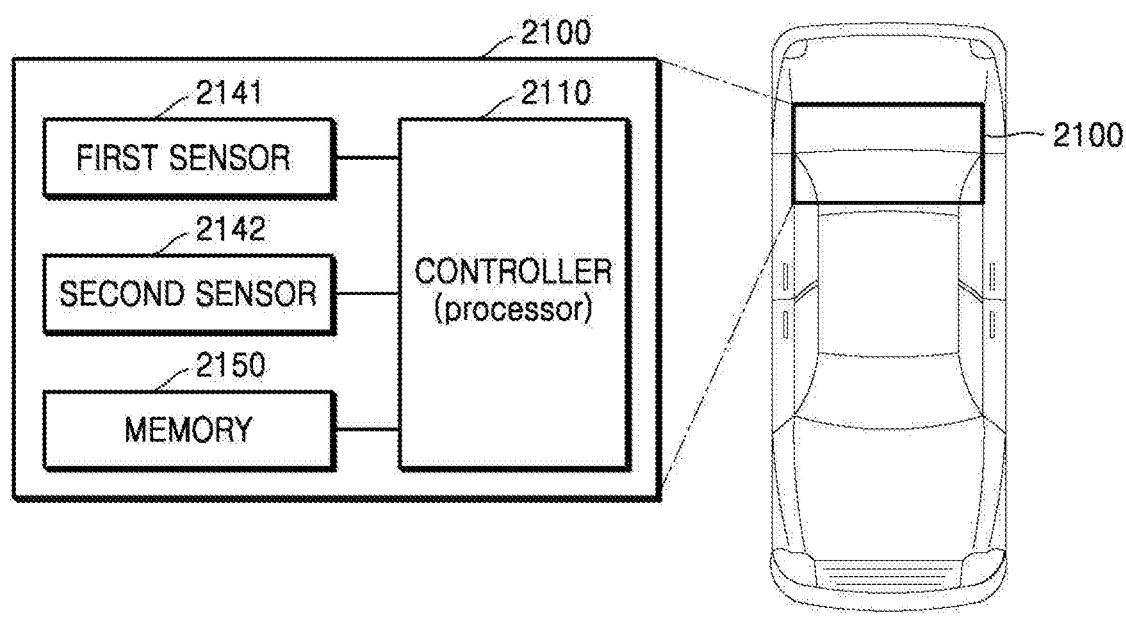

| CLASSIFICATION | SENSOR | WEIGHT APPLICATION ENVIRONMENT FACTOR |
|---|---|---|
| IMAGE SENSOR | RGB CAMERA | ILLUMINATION, SNOWFALL |
| | IR CAMERA | RAINFALL |
| | THERMAL IMAGING CAMERA | RAINFALL |
| DISTANCE SENSOR | LIDAR | RAINFALL |
| | RADAR | – |
| | ULTRASONIC SENSOR | TUNNEL, CORNER REGION |
| | IR SENSOR | – |

ELECTRONIC DEVICE AND METHOD FOR RECOGNIZING OBJECT BY USING PLURALITY OF SENSORS

CROSS-REFERENCE TO RELATED APPLICATION(S)

This application claims the benefit under 35 U.S.C. § 119(a) of a Korean patent application filed on Dec. 14, 2016 in the Korean Intellectual Property Office and assigned Serial number 10-2016-0170404, the entire disclosure of which is hereby incorporated by reference.

TECHNICAL FIELD

The present disclosure relates to an electronic device and method for recognizing an object by using a plurality of sensors. More particularly, the present disclosure relates to a device and method for storing data in a database based on data obtained through a plurality of sensors.

BACKGROUND

Object recognition technology according to the related art involves image recognition using only one sensor, that is, image recognition through a single sensor. In the case of using the single sensor, image recognition may be difficult with only the one sensor since a low recognition accuracy environment may be present for the sensor to operate in (for example, night, rain, winter, summer, existence of a great amount of steel nearby, etc.). In the case of a recognition failure from single sensor data, image recognition through the single sensor requires an additional correction of an algorithm or algorithm parameters through a manual operation outside a system in order to improve performance. Such an additional correction operation causes a delay in recognition of sequentially input object recognition images, which results in insufficient physical time for object recognition. Finally, there is a technical problem in that an object is not recognized. Also, when recognizing an object using a plurality of sensors, there is a problem in that it is difficult to effectively use a plurality of pieces of sensing data to recognize the object.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an updating algorithm for processing existing sensor data or algorithm parameters when an existing sensor does not recognize (or fails to recognize) an object by using a plurality of sensors, thereby resulting in successful object recognition without any correction operation of the existing sensor later.

In accordance with an aspect of the present disclosure, a method of recognizing an object, the method performed by an electronic device, is provided. The method includes obtaining first sensing data from a first sensor that senses the object, obtaining second sensing data from a second sensor that senses the object, obtaining a first object recognition reliability for the object and a second object recognition reliability for the object respectively based on the first sensing data and the second sensing data, based on the first object recognition reliability and the second object recognition reliability, matching object information of the object recognized using the second sensing data to the first sensing data, and storing the matched object information in a database of one of the first sensor and the second sensor.

In accordance with an aspect of the present disclosure, a device for recognizing an object is provided. The device includes a first sensor configured to obtain first sensing data of the object sensed by the first sensor, a second sensor configured to obtain second sensing data of the object sensed by the second sensor, and at least one processor configured to obtain a first object recognition reliability for the object and a second object recognition reliability for the object respectively based on the first sensing data and the second sensing data, based on the first object recognition reliability and the second object recognition reliability, match object information of the object recognized by using the second sensing data to the first sensing data and store the matched object information in a database of one of the first sensor and the second sensor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of present disclosure will be more apparent from the following description taken in conjunction with the accompanying drawings, in which:

FIG. 1 is a diagram illustrating an example in which an electronic device recognizes an object by using a plurality of sensors, according to an embodiment of the present disclosure;

FIG. 19 is a diagram of an example of an environment factor considered in determining a weight for object recognition reliability, according to an embodiment of the present disclosure;

Throughout the drawings, it should be noted that like reference numbers are used to depict the same or similar elements, features, and structures.

DETAILED DESCRIPTION

Figure 2:
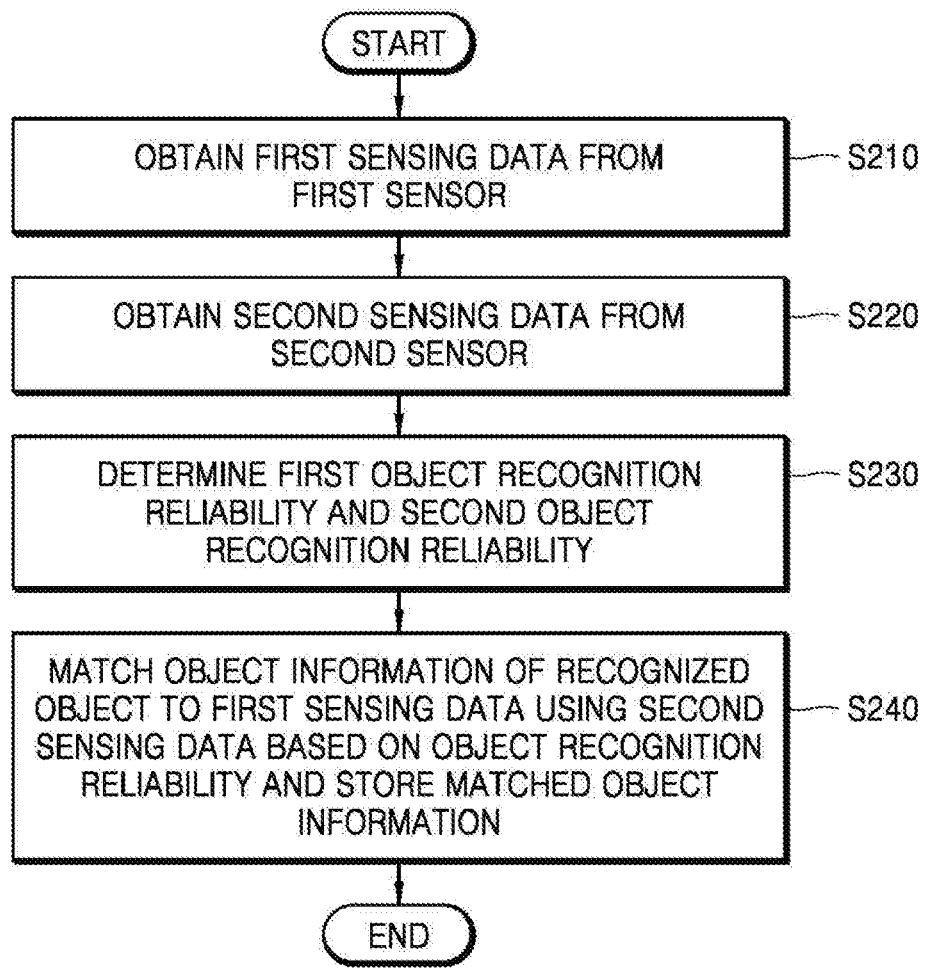
FIG. 2 is a flowchart of a method in which an electronic device stores object information generated using a plurality of sensors, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the specification, when a part is referred to as being "connected" to another part, it includes not only "directly connected" but also "electrically connected" with another part therebetween. Also, when an element is referred to as "comprising", it means that it may include other elements, not excluding other elements unless specifically stated otherwise.

The present disclosure will be described in detail with reference to the accompanying drawings.

FIG. 1 is a diagram illustrating an example in which an electronic device 2100 recognizes an object 111 using a plurality of sensors according to an embodiment of the present disclosure.

Referring to FIG. 1, the electronic device 2100 according to an embodiment of the present disclosure may recognize the object 111 of a periphery 110 of the electronic device 2100 using a first sensor 2141 and a second sensor 2142. The electronic device 2100 may include a controller 2110 (e.g., at least one processor), the first sensor 2141, the second sensor 2142, and a memory 2150 (e.g., a storage).

The first sensor 2141 and the second sensor 2142 may obtain first sensing data and second sensing data, respectively. The controller 2110 may obtain first object recognition reliability and second object recognition reliability of the first sensing data and the second sensing data. The controller 2110 may determine whether to update object information of the recognized object 111 using the second sensing data obtained through the second sensor 2142 to a database of the first sensor 2141 based on the first object recognition reliability and the second object recognition reliability. The controller 2110 may match the object information of the recognized object 111 using the second sensing data obtained through the second sensor 2142 with the first sensing data and store the matched object information in the database of the first sensor 2141.

For example, if a vehicle is traveling on a road, there may be a person, a speed limiter, a roadside tree, and animals in the vicinity of the vehicle, and a plurality of sensors may be included inside the vehicle to recognize nearby objects. For example, if the vehicle includes a red green blue (RGB) sensor and an infrared (IR) sensor, the RGB sensor may better recognize objects during the day, and the IR sensor may better recognize objects at night. If the vehicle is traveling on the road during the day, the RGB sensor of the vehicle may do better object recognition than the IR sensor. The controller 2110 included in the vehicle may improve the object recognition performance of the IR sensor by matching object information of an object recognized by using the RGB sensor during the day with sensing data of the IR sensor and storing the matched object information in a database of the IR sensor.

For example, matching and storing performed by the controller 2110 may include corresponding a part of the first sensing data corresponding to a position of the object to a part of the second sensing data corresponding to the position of the object and classifying and storing the corresponding part of the first sensing data in a database as a recognition result of the first sensing data.

The controller 2110 may extract data of a part of the second sensing data where the object is recognized and select a part of the first sensing data corresponding to a position of the recognized object. The controller 2110 may classify and store identification information of the recognized object using the second sensing data, together with a part of the first sensing data, in the database of the first sensing data as object information.

Also, for example, matching and storing performed by the controller 2110 may include converting the obtained object information of the second sensing data into object information of the first sensor 2141 and storing the converted object information of the second sensing data in a database of the first sensor 2141. When the object is recognized using the second sensing data, matching and storing performed by the controller 2110 may include identification information of the recognized object and information of a part of the second sensing data corresponding to the recognized object in the database of the first sensor 2141 as object information.

For example, the information of the part of the second sensing data corresponding to the recognized object may include object image data of the object.

The memory 2150 may include a training database, an existing parameter database, or a parameter database for other sensor. The training database may store some sensed images or data obtained via a sensor. The existing parameter database may store parameters extracted from the training database. The parameter database for other sensor may store extracted parameters matching respective sensing data.

The electronic device 2100 may include an automobile, a drone, and a cleaning robot, but not limited to, and may include any type of electronic device 2100 capable of recognizing an object using at least one sensor. Also, an object may mean all things that a sensor may recognize. For example, the object may be a pedestrian (a child), a pedestrian (an adult), a car (a bus, a sedan, a sports utility vehicle (SUV), a van, a truck, a trailer, a fork crane or a passenger car), a two-wheel vehicle (a person riding a bicycle and a person riding a motorcycle), animal (dogs, cats, deer, and birds), trees, sensors (temperature sensors, carbon dioxide sensors, and sprinklers), walls, and speeding bumps but is not limited thereto.

A recognition reliability may mean a value determined based on a degree of similarity based on shapes of a database image and a sensed image, or colors. Also, the recognition reliability may be a value determined through a feature extracted from input data and a parameter of a database. Also, the recognition reliability may be determined based on a type of a sensor and an external condition of the electronic device 2100. Also, if there is no recognition reliability in sensor data, a lowest recognition reliability may be assigned to the sensor data.

According to an embodiment, when a reference value of the recognition reliability differs for each sensor, the reference value of the recognition reliability may be corrected according to a predetermined reference to obtain a common recognition reliability. For example, the common recognition reliability may represent a reference value of recognition reliability that may be equally applied to RGB cameras, IR cameras, thermal cameras, lidars, radars, ultrasonic sensors, and IR sensors.

FIG. 2 is a flowchart of a method in which the electronic device 2100 stores object information generated using a plurality of sensors according to an embodiment of the present disclosure.

In operation S210, the electronic device 2100 may obtain first sensing data about a peripheral object of the electronic device 2100 from the first sensor 2141. In operation S220, the electronic device 2100 may obtain second sensing data about the peripheral object of the electronic device 2100 from the second sensor 2142.

Referring to FIG. 2, the first sensor 2141 may be an image sensor or a distance sensor. The second sensor 2142 may be an image sensor or a distance sensor. The image sensor is a sensor that identifies an object using visible light, IR, or temperature, and may include, but not limited to, an RGB camera, an IR camera, or a thermal imaging camera. Data obtained from the RGB camera may be x, y pixel values and an image (visible light). Data obtained from the IR camera may be an x, y pixel valued and an image (an IR value). Data obtained from the thermal imaging camera may be an x, y pixel values and an image (a temperature value). Also, the distance sensor may be a sensor capable of measuring a distance to an object, and may include, but not limited to, a lidar, a radar, an ultrasonic sensor, or an IR sensor. Data obtained from the lidar may be distance, azimuth, height, a 3D image (surface properties), or metal/non-metal (physical properties). Data obtained from the radar may be distance, azimuth, velocity (moving speed), metal/non-metal/moving object (physical properties) Data obtained from the ultrasonic sensor may be information about distance (azimuth), and presence or absence of an object. Data obtained from the IR sensor may be information about distance and presence or absence of an object.

Also, the first sensor 2141 and the second sensor 2142 may be sensors of different types, but are not limited thereto. The first sensor 2141 and the second sensor 2142 may be the same type of sensors.

In this regard, the sensing data may include data representing images of visible light, an IR value, temperature, etc. or object properties such as distance from an object, metal, non-metal, etc.

In operation S230, the electronic device 2100 may determine a first object recognition reliability and a second object recognition reliability for the object. The first object recognition reliability may be an object recognition reliability of the object recognized using the first sensor 2141. The second object recognition reliability may be an object recognition reliability of the object recognized using the second sensor 2142. The object recognition reliability may include, for example, reliability of the sensing data, or accuracy of the sensing data, but is not limited thereto, and may be calculated by a predetermined reference. For example, a controller may determine the object recognition reliability based on a difference between resolution of the sensed sensing data and a previously stored reference resolution.

According to an embodiment, the electronic device 2100 may obtain the first sensing data or the second sensing data from the first sensor 2141 or the second sensor 2142. The first sensing data and the second sensing data may include at least one of raw data of a sensor, such as image, distance, azimuth, etc. and information obtained by processing the raw data. The controller 2110 of the electronic device 2100 may extract feature values of the first sensing data and the second sensing data. For example, the feature values may include edges, lines, points, radar cross sections (RCS), object velocities, or combinations of several feature values extracted from the raw data. Also, the controller 2110 of the electronic device 2100 may determine recognition reliability of sensing data obtained using the extracted feature values and parameters stored in the parameter database. For example, the parameters may include edges, lines, points, radar cross sections (RCS), object velocities, or combinations of parameters extracted from at least one of an image or data of a specific object to recognize the specific object. The feature values and the parameters are not limited to the configurations described and may include various values associated with data received from sensors. Also, for example, the parameter database may store various classifications such as a pedestrian, a baby carriage, and a streetlight in addition to a classification of vehicle.

According to an embodiment, when the controller 2110 of the electronic device 2100 calculates the recognition reliability, the controller 2110 may determine the recognition reliability that a recognition target is a corresponding classification using the parameters corresponding to recognition target classifications. For example, when a feature value of the first sensing data obtained from the first sensor 2141 is 'vehicle', the controller 2110 may compare a parameter corresponding to a 'vehicle' classification of the parameter database with the feature value of the first sensing data to determine the recognition reliability.

According to an embodiment, when the controller 2110 of the electronic device 2100 recognizes an object by using a deep learning method, a feature value database may be used in a feature value extracting operation. The feature value database may previously store edges, lines, points, radar cross sections (RCSs), object velocities, or combinations of various feature values. In operation S240, the electronic device 2100 may match object information of the recognized object using the second sensing data to the first sensing data based on the obtained first object recognition reliability and second object recognition reliability and store the matched object information in a database of the first sensor 2141. Matching and storing may include selecting a part of the first sensing data corresponding to a position of the recognized object and storing identification information of the recognized object together with a part of the first sensing data in the database of the first sensor as object information.

For example, the electronic device 2100 may compare magnitudes of the first object recognition reliability and the second object recognition reliability, and based on a comparison result, match the object information of the recognized object using sensing data having a high object recognition reliability to sensing data having a low object recognition reliability and store the matched object information. Also, for example, the electronic device 2100 may determine whether the first object recognition reliability and the second object recognition reliability are equal to, or greater than or less than a predetermined threshold value, and use any one piece of sensing data based on a determination result to match the object information of the recognized object to another piece of sensing data and store the matched object information. Also, for example, the electronic device 2100 may match the object information of the object recognized using the second sensing data to one of the first sensor 2141, the first sensing data, and the object information recognized using the first sensing data and store the matched object information.

According to an embodiment, the database of the first sensor 2141 may be included in the first sensor 2141 or may be included in an external storage device.

According to an embodiment, the electronic device 2100 may convert the object information recognized by the second sensing data into a type of sensing data of the same kind as the first sensing data in accordance with a type of the first sensing data, and match the converted object information to the first sensor 2141 and store the matched object information. For example, the electronic device 2100 may convert position information coordinates of the object information recognized by the second sensing data in accordance with position information coordinates of the first sensing data and classify and store a part of sensing data corresponding to the converted positional information coordinates in the database.

For example, when the first sensor 2141 is an RGB camera and the second sensor 2142 is an IR camera, the electronic device 2100 may match object information recognized by the RGB camera in a bright environment (for example, daylight) to sensing data of the IR camera and store the matched object information in the database. Alternatively, the electronic device 2100 may extract parameters using feature values of an object recognized by the RGB camera in the bright environment and store the extracted parameters in a database of the IR camera. Conversely, when the object recognition reliability of the RGB camera is low in a dark environment (for example, winter or night), the electronic device 2100 may match object information recognized by the IR camera to sensing data of the RGB camera and store the matched object information in the database. Alternatively, the electronic device 2100 may extract parameters using feature values of an object recognized by the IR camera in the dark environment, and store the extracted parameters in a database of the RGB camera.

For example, when the first sensor 2141 is an RGB camera and the second sensor 2142 is also the RGB camera, the electronic device 2100 may calculate a difference according to an angle at which the object is recognized, correct a calculated object based on the recognized angle difference, and store corrected object information in the database.

For example, when the first sensor 2141 is a radar and the second sensor 2142 is an RGB camera, the electronic device 2100 may match object information recognized by the radar in a dark environment to sensing data of the RGB camera and store the matched object information in a database of the RGB camera. Alternatively, the electronic device 2100 may extract parameters using feature values of the object recognized by the radar in a dark environment and store the extracted parameters in a database of the RGB camera.

For example, when the first sensor 2141 is an RGB camera and the second sensor 2142 is a lidar, the electronic device 2100 may match object information recognized by the RGB camera in a bright environment to sensing data of the lidar and store the matched object information in a database of the lidar. Alternatively, the electronic device 2100 may extract parameters using feature values of the object recognized by the RGB camera in the bright environment and store the extracted parameters in the database of the lidar.

Also, for example, when the first sensor 2141 is an RGB camera and the second sensor 2142 is an ultrasonic sensor, the electronic device 2100 may match object information recognized by the RGB camera in a bright environment to sensing data of the ultrasonic sensor and store the matched object information in a database of the ultrasonic sensor. Alternatively, the electronic device 2100 may store parameters extracted using feature values of the object recognized by the RGB camera in the bright environment in the database of the ultrasonic sensor.

For example, when the first sensor 2141 is a radar and the second sensor 2142 is a lidar, the electronic device 2100 may match object information recognized by the radar in case of rain to sensing data of the lidar and store the matched object information in a database of the lidar. Alternatively, the electronic device 2100 may store parameters extracted using feature values of the object recognized by the radar in case of rain in the database of the lidar.

However, according to an embodiment, the electronic device 2100 may determine if the object recognition reliability of the sensing data obtained from each sensor is less than a predetermined third threshold value. Here, the predetermined third threshold value may be a value indicating that the recognition reliability may not be obtained using a feature value and a parameter or a degree of similarity with a specific classification of a database may not be calculated because the feature value extracted through the sensing data is absent or too small. For example, if the object recognition reliability of the sensing data is less than the predetermined third threshold value, the controller of the electronic device 2100 may determine that a sensor has not recognized the object at all.

For example, when the electronic device 2100 determines that the object recognition reliability of the sensing data obtained from the first sensor 2141 is less than the third threshold value, the electronic device 2100 may not extract and store parameters corresponding to feature values of the sensing data obtained from the second sensor 2142 in the database of the first sensor 2141 irrespective of magnitude of recognition reliability of the sensing data obtained from the second sensor 2142.

According to an embodiment, the electronic device 2100 may determine whether the objects recognized by the first sensing data obtained by the first sensor 2141 and the second sensing data obtained by the second sensor 2142 are the same. If it is determined that the objects recognized by the first sensing data and the second sensing data are the same, the electronic device 2100 may not extract and store the parameters corresponding to the feature values of the sensing data obtained from the first sensor 2141 and the second sensor 2142 in the respective database of the first sensor 2141 and the second sensor 2142 irrespective of magnitude of object recognition reliability of the obtained sensing data. Alternatively, when it is determined that the objects recognized by the first sensing data and the second sensing data are the same, the electronic device 2100 may not match and store information obtained from the first sensor 2141 and the second sensor 2142 irrespective of the magnitude of the object recognition reliability of the obtained sensing data.

Figure 3:
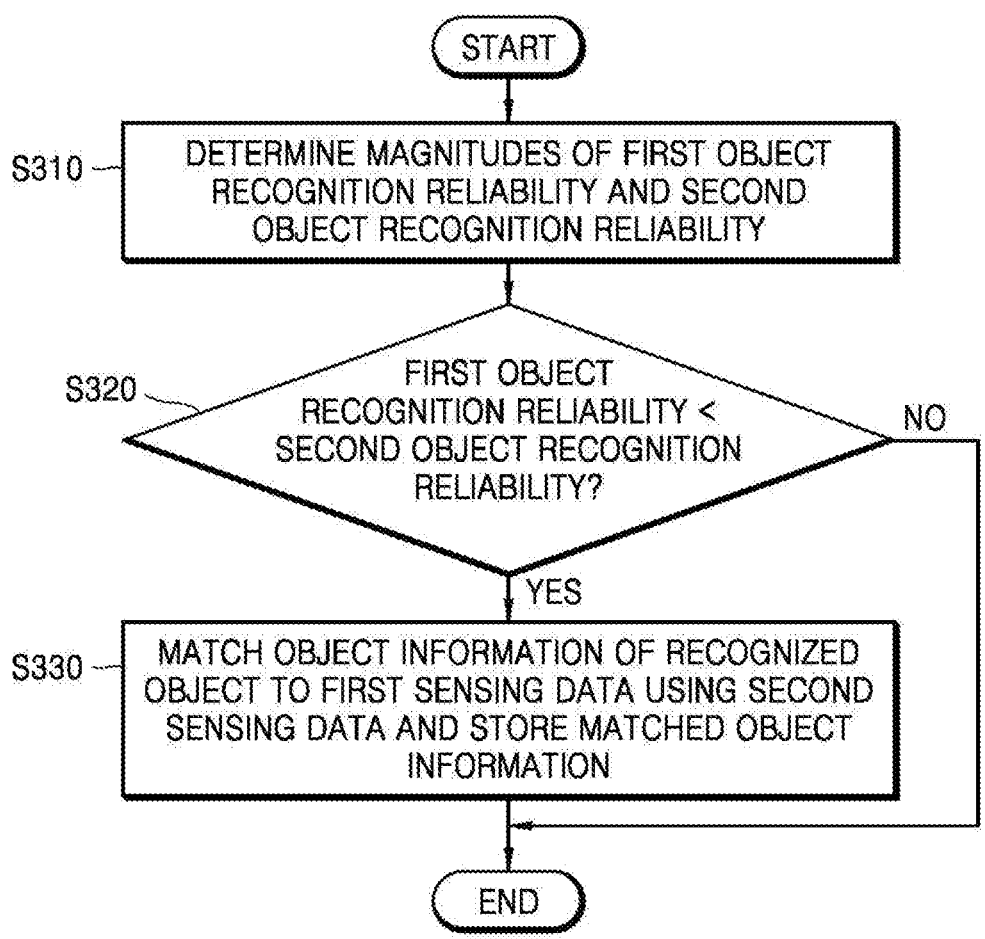
FIG. 3 is a detailed flowchart of a method in which an electronic device recognizes an object depending on a first object recognition reliability and a second object recognition reliability, according to an embodiment of the present disclosure.

FIG. 3 is a detailed flowchart of a method in which the electronic device 2100 recognizes an object depending on a first object recognition reliability and a second object recognition reliability according to an embodiment of the present disclosure.

Referring to FIG. 3, in operation S310 the electronic device 2100 may determine magnitudes of the first object recognition reliability and the second object recognition reliability. In operation S320, the electronic device 2100 may compare the magnitudes of the first object recognition reliability and the second object recognition reliability. For example, in a dark environment, an object recognition reliability of an RGB camera may be lower than that of an IR camera or a radar. Also, for example, in a bright environment, an object recognition reliability of a lidar may be lower than that of the RGB camera. Also, for example, in the case of rain, the object recognition reliability of lidar may be lower than that of the radar because of scattering.

In operation S330, when the magnitude of the first object recognition reliability is smaller than the magnitude of the second object recognition reliability, the electronic device 2100 may match object information of a recognized object using second sensing data to first sensing data and store the matched object information in a database of the first sensor 2141. Matching and storing may include selecting a part of the first sensing data corresponding to a position of the recognized object and storing identification information of the recognized object together with a part of the first sensing data in the database of the first sensor 2141 as object information.

According to an embodiment, the electronic device 2100 may determine extracted parameters using feature values of the second sensing data. For example, when the first sensor 2141 and the second sensor 2142 are recognized as objects different from each other, the electronic device 2100 may match object information recognized using data of the second sensor 2142 data having a high object recognition reliability to data of the first sensor 2141 having a low object recognition reliability and store the matched object information. On the other hand, if the first object recognition reliability is greater than the second object recognition reliability, new object information may not be stored in the database of the first sensor 2141. For example, the electronic device 2100 may store parameters extracted using feature values of the object recognized by the second sensor 2142 in the database of the first sensor 2141.

On the other hand, when the electronic device 2100 determines that the magnitude of the first object recognition reliability is greater than the magnitude of the second object recognition reliability, the electronic device 2100 may classify and store sensing data obtained by using the recognized object information.

However, as described above, when the electronic device 2100 determines that object recognition reliability of sensing data obtained from the first sensor 2141 is less than a third threshold value, the electronic device 2100 may not extract and store parameters corresponding to feature values of sensing data obtained from the second sensor 2142 in the database of the first sensor 2141 irrespective of magnitude of the object recognition reliability of the sensing data obtained from the second sensor 2142.

According to an embodiment, the electronic device 2100 may determine whether objects recognized by the first sensing data obtained by the first sensor 2141 and the second sensing data obtained by the second sensor 2142 are the same. If it is determined that the objects recognized by the first sensing data and the second sensing data are the same, the electronic device 2100 may not extract and store the parameters corresponding to the feature values of the sensing data obtained from the first sensor 2141 and the second sensor 2142 in the respective database of the first sensor 2141 and the second sensor 2142 irrespective of magnitude of object recognition reliability of the obtained sensing data. Alternatively, when it is determined that the objects recognized by the first sensing data and the second sensing data are the same, the electronic device 2100 may not match and store information obtained from the first sensor 2141 and the second sensor 2142 irrespective of the magnitude of the object recognition reliability of the obtained sensing data.

Figure 4:
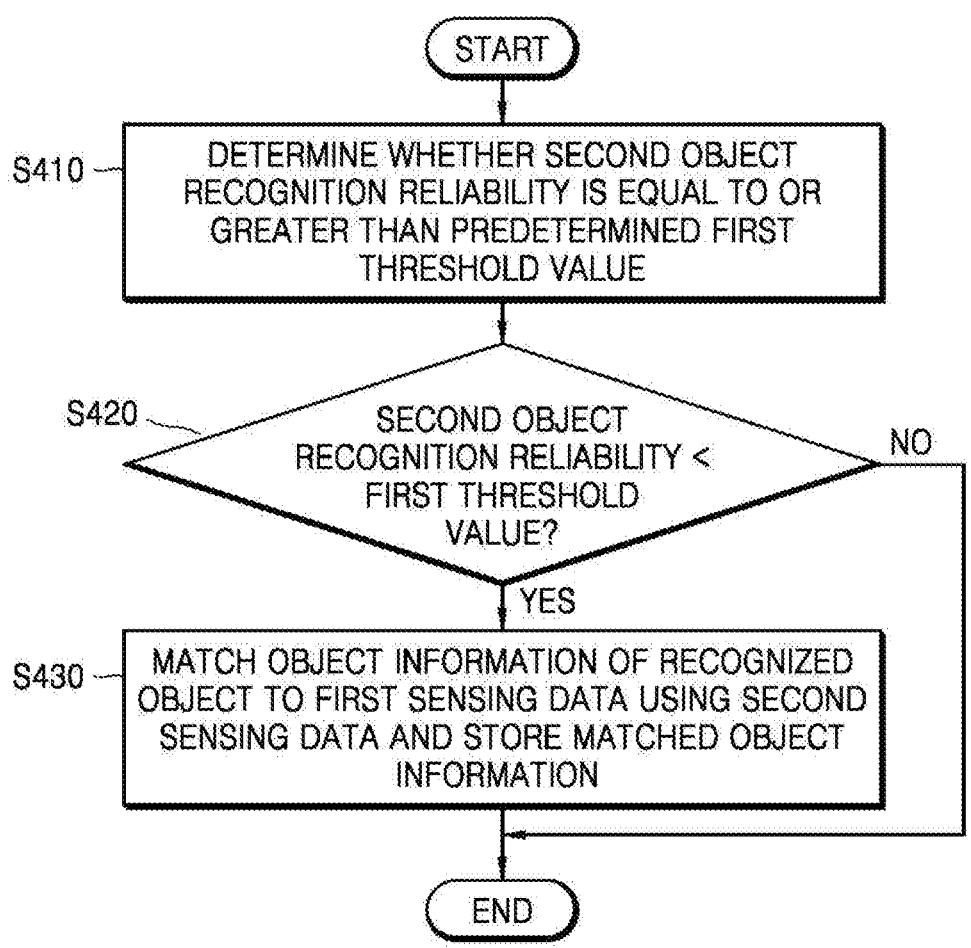
FIG. 4 is a detailed flowchart of a method in which an electronic device recognizes an object depending on magnitudes of a second object recognition reliability and a first threshold value, according to an embodiment of the present disclosure.

FIG. 4 is a detailed flowchart of a method in which the electronic device 2100 recognizes an object depending on magnitudes of a second object recognition reliability and a first threshold value according to an embodiment of the present disclosure.

Referring to FIG. 4, in operation S410 the electronic device 2100 may determine whether the second object recognition reliability is equal to or greater than the predetermined first threshold value. The predetermined first threshold value may be a value indicating that accuracy or reliability of sensing data is equal to or greater than a predetermined reference value. For example, when object recognition reliability of the sensing data is equal to or greater than the predetermined first threshold value, a controller of the electronic device 2100 may determine that reliability of an object recognized by a sensor is prior to reliability of an object recognized by another sensor.

In operation S420, if it is determined that the second object recognition reliability is equal to or greater than the predetermined first threshold value, in operation S430, the electronic device 2100 may match object information of the recognized object using second sensing data to first sensing data and store the matched object information in a database of the first sensor 2141. Matching and storing may include selecting a part of the first sensing data corresponding to a position of the recognized object and storing identification information of the recognized object together with a part of the first sensing data in the database of the first sensor 2141 as object information.

According to an embodiment, the electronic device 2100 may determine extracted parameter using feature values of the second sensing data. For example, the electronic device 2100 may store the object information matched to the first sensing data in the database of the first sensor 2141. For example, the electronic device 2100 may store extracted parameters using feature values of an object recognized by the second sensor 2142 in the database of the first sensor 2141. For example, when the first sensor 2141 does not recognize the object at all and the second sensor 2142 recognizes the object, the electronic device 2100 may determine whether the second object recognition reliability of the second sensing data is equal to or greater than the predetermined first threshold value, thereby determining whether to store the object information in the database of the first sensor 2141.

However, as described above, when the electronic device 2100 determines that object recognition reliability of sensing data obtained from the first sensor 2141 is less than a third threshold value, the electronic device 2100 may not extract and store the parameters corresponding to the feature values of the sensing data obtained from the second sensor 2142 in the database of the first sensor 2141 irrespective of magnitude of object recognition reliability of the sensing data obtained from the second sensor 2142.

On the other hand, in operation S420, if it is determined that the second object recognition reliability is less than the predetermined first threshold value, the electronic device 2100 may not update data obtained from the first sensor 2141 or the second sensor 2142. For example, even though the first sensor 2141 does not recognize the object and the second sensor 2142 recognizes the object as a predetermined object recognition reliability, if the object recognition reliability of the second sensor 2142 is less than the first threshold value, the database of the first sensor 2141 and a database of the second sensor 2142 may not store new object information.

Figure 5:
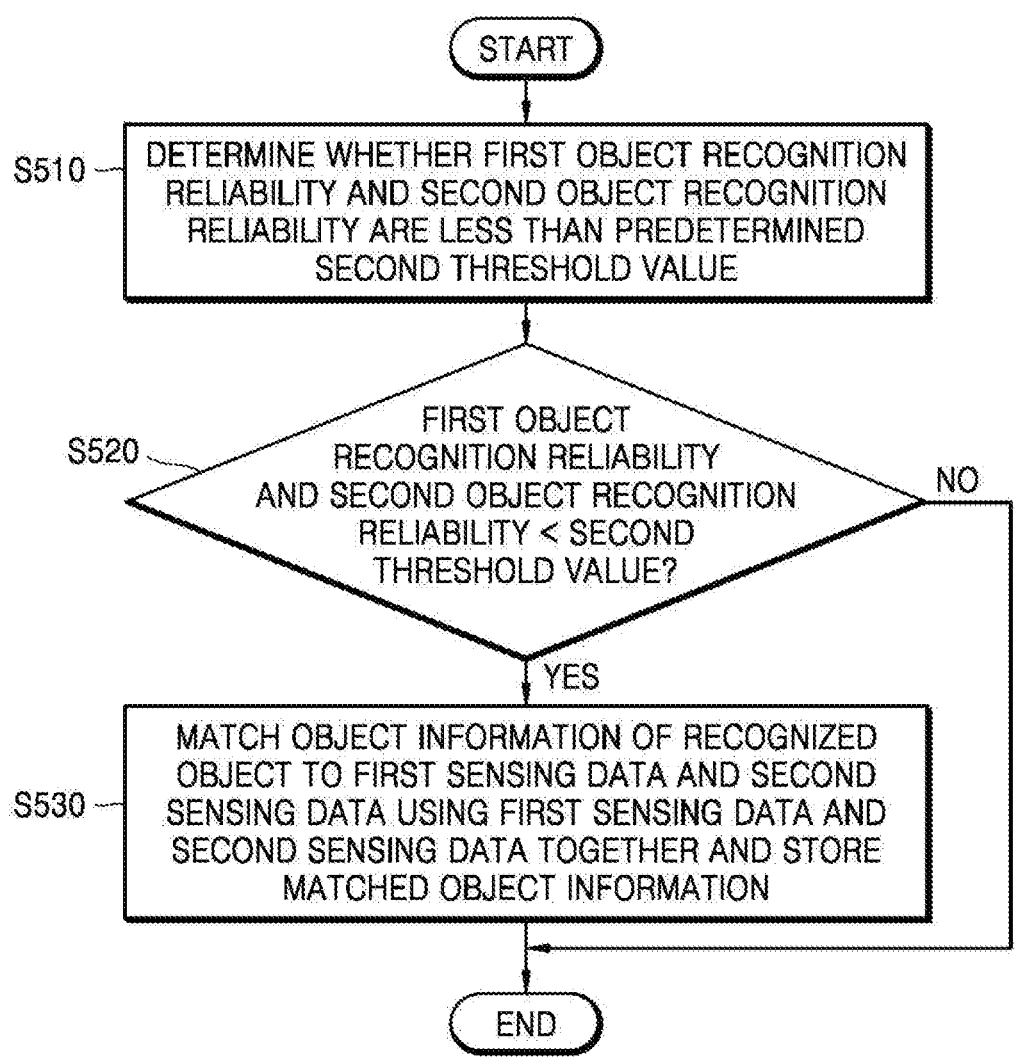
FIG. 5 is a detailed flowchart of a method in which an electronic device recognizes an object depending on magnitudes of a first object recognition reliability, a second object recognition reliability, and a second threshold value, according to an embodiment of the present disclosure.

FIG. 5 is a detailed flowchart of a method in which the electronic device 2100 recognizes an object depending on magnitudes of a first object recognition reliability, a second object recognition reliability, and a second threshold value according to an embodiment of the present disclosure.

Referring to FIG. 5, in operation S510 the electronic device 2100 may determine whether the first object recognition reliability and the second object recognition reliability are less than the predetermined second threshold value. Here, the predetermined second threshold value may be a value indicating that accuracy or reliability of sensing data is less than a predetermined reference. For example, when an object recognition reliability of the sensing data is less than the predetermined second threshold value, a controller of the electronic device 2100 may determine that a sensor does not recognize the object.

In operation S520, if it is determined that each of the first object recognition reliability and the second object recognition reliability is less than the predetermined second threshold value, in operation S530, the electronic device 2100 may match object information of the recognized object using first sensing data and second sensing data together to each of the first sensing data and the second sensing data and store the object information matched to the first sensing data and the second sensing data in a database of the first sensor 2141 and a database of the second sensor 2142. Matching and storing may include selecting a part of the first sensing data corresponding to a position of the recognized object and storing identification information of the recognized object together with a part of the first sensing data in the database of the first sensor 2141 as object information.

For example, the electronic device 2100 may store parameters extracted using feature values of the recognized object using the first sensing data and the second sensing data in the database of the first sensor 2141 and the database of the second sensor 2142 using the first sensing data and second sensing data. For example, when the first sensor 2141 does not recognize the object and the second sensor 2142 does not recognize the object (i.e., when the first object recognition reliability and the second object recognition reliability are less than the predetermined second threshold value), the electronic device 2100 may match the object information of the recognized object using the first sensing data and the second sensing data together to each sensor data and store the matched object information in a database. Further, when the first object recognition reliability and the second object recognition reliability are less than a predetermined first threshold value, the electronic device 2100 may not store new object information in the database. The electronic device 2100 may obtain a third object recognition reliability of the recognized object using the first sensing data and the second sensing data together. Also, the controller may determine whether the third object recognition reliability is equal to or greater than the predetermined first threshold value. When the controller determines that the third object recognition reliability is higher than the first threshold value, the controller may match the object information of the recognized object using the first sensing data and the second sensing data together to each of the first sensing data and the second sensing data. The controller may store the matched object information in the database of the first sensor 2141 and the database of the second sensor 2142. Matching and storing may include selecting a part of the first sensing data corresponding to the position of the recognized object and storing the identification information of the recognized object together with the part of the first sensing data in the database of the first sensor 2141 as the object information.

On the other hand, in operation S520, if it is determined that the second object recognition reliability is greater than the predetermined second threshold value, the electronic device 2100 may classify and store the sensing data obtained as recognized object information values.

However, as described above, when the electronic device 2100 determines that the object recognition reliability of the sensing data obtained from the first sensor 2141 and the object recognition reliability of the sensing data obtained from the second sensor 2142 are less than a third threshold value, the electronic device 2100 may not extract and store the parameters corresponding to the feature values of the sensing data obtained from each of the first sensor 2141 and the second sensor 2142 in the database of each of the first sensor 2141 and the second sensor 2142 irrespective of magnitude of object recognition reliability of the obtained sensing data.

Figure 6:
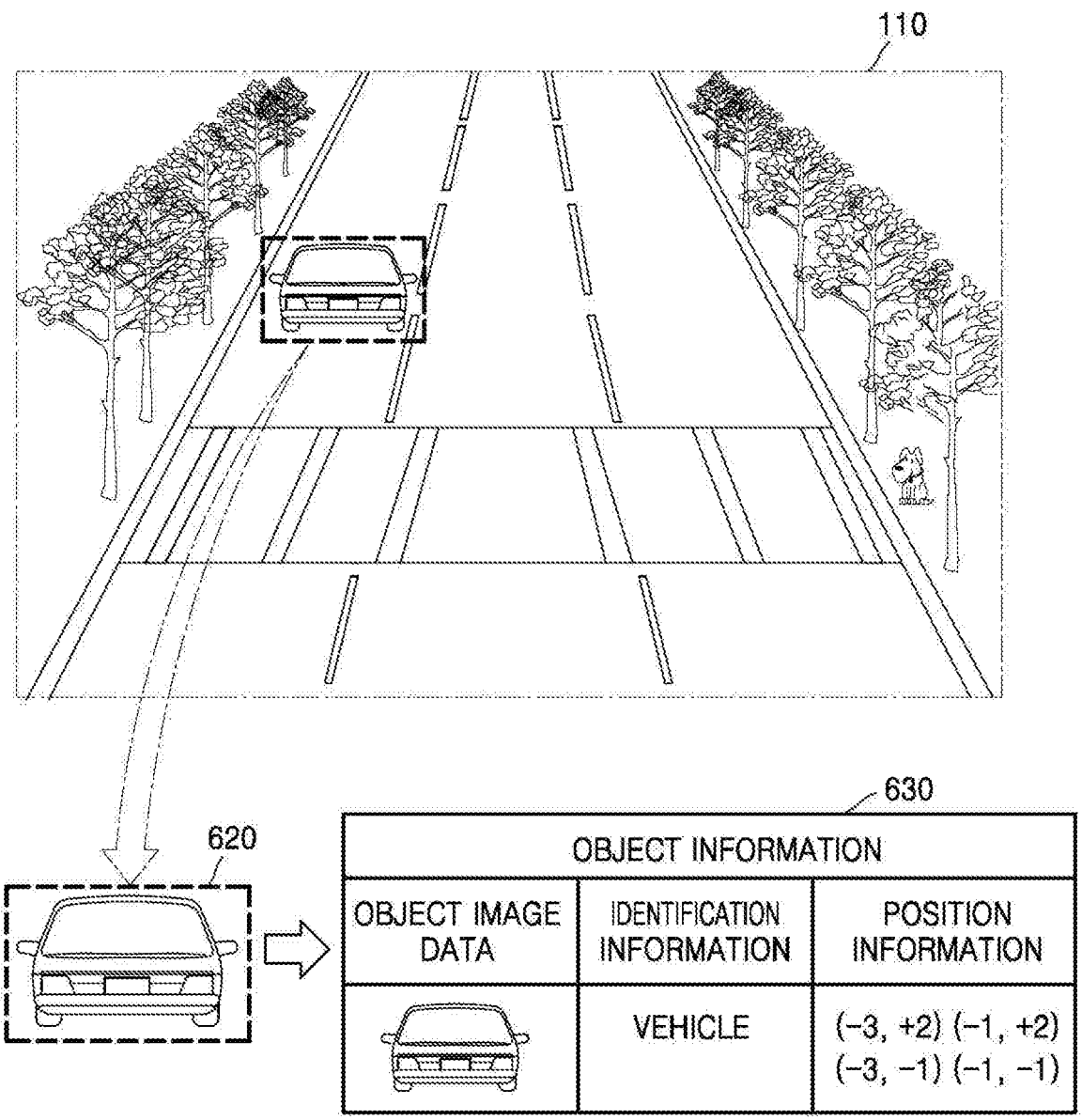
FIG. 6 is a diagram illustrating an example of object information according to an embodiment of the present disclosure.

FIG. 6 is a diagram illustrating an example of object information according to an embodiment of the present disclosure.

Referring to FIG. 6, the electronic device 2100 may obtain object portion image data 620 corresponding to an object portion to be recognized from sensing data, and may obtain object information 630 from the object portion image data 620. Also, the object information 630 may include at least one of object image data indicating a shape of the object on the object portion image data 620, identification information of the object, and position information of the object. The object information 630 may include at least one of object image data corresponding to an image corresponding to the object portion, identification information indicating a type of the object, and position information indicating a relative position of the object around the electronic device 2100. For example, the object portion image data 620 may be RGB image data identified by visible light when a sensor is an RGB camera, temperature image data identified using temperature when the sensor is a thermal imaging camera, and may be surface feature image data identified using a surface feature when the sensor is a lidar. Also, for example, the position information may be represented by x, y coordinate values when the sensor is an image sensor, and may be represented by r, θ, φ coordinate values when the sensor is a distance sensor, but is not limited thereto.

For example, the electronic device 2100 may obtain sensing data 610 around the electronic device 2100 using an RGB camera and obtain the object portion image data 620 from the obtained sensing data 610. The electronic device 2100 may obtain object information from the obtained object portion image data 620. The object information may include identification information indicating the type of the object and position information indicating the relative position of the object within a periphery of the electronic device 2100. When the sensor is an RGB camera, the RGB camera may obtain object information including at least one of object image data which is information about an image of the object recognized as an image sensor, identification information indicating that the object is a vehicle as identification information of the object obtained from the object image data, and position information in the form of x, y coordinate values of a vehicle.

Further, the electronic device 2100 may store at least one of the object image data, the identification information, and the position information included in the object information in a database according to a predetermined condition.

Figure 7:
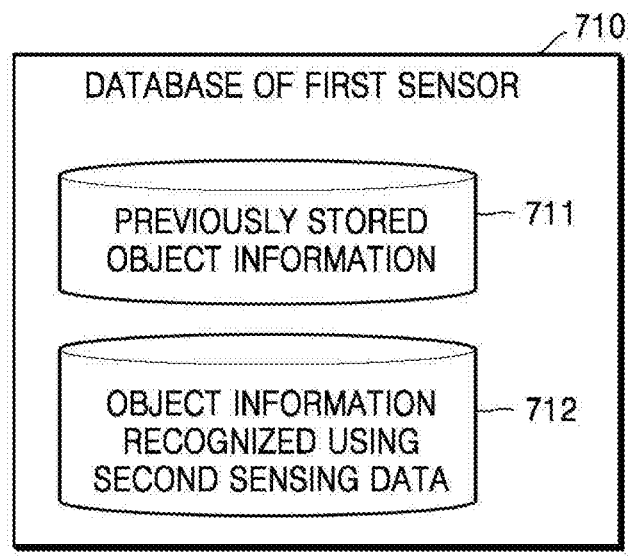
FIG. 7 is a diagram illustrating an example in which object information recognized using second sensing data is separately stored in a database of a sensor, according to an embodiment of the present disclosure.

FIG. 7 is a diagram illustrating an example in which object information recognized using second sensing data is separately stored in a database 710 of a sensor according to an embodiment of the present disclosure.

Referring to FIG. 7, the database of the sensor may include a storage space 711 for storing previously stored object information and a storage space 712 for storing object information recognized using the second sensing data. For example, the storage space 711 and the storage space 712 may be physically separated or logically separated.

According to an embodiment, the database 710 of the sensor may include at least one of a database of existing parameters or a database of parameters obtained using another sensor.

According to an embodiment, the first sensing data may be stored in the database 710 of the sensor, the first sensing data succeeding object recognition may be stored in the storage space 711 using only the first sensing data, and the first sensing data that failed object recognition using the first sensing data but succeeded object recognition using the second sensing data may be stored in the storage space 712.

According to an embodiment, annotation or label assigned to the first sensing data may be object information (object identification information). The object information may be classified in the storage space 711 and the storage space 712 using the same information and may be classified using different information. For example, classification using the same information may be classification of human, human like, vehicle, and vehicle like in the storage space 711 and the storage space 712, and classification using different information may be classification of human and vehicle in the storage space 711 and human like and vehicle like in the storage space 712.

According to an embodiment, the electronic device 2100 may store the recognized object information using the second sensing data in a storage space separate from the previously stored object information, thereby making different alarms for the recognized object using the previously stored object information and the recognized object using the second sensing data. The alarm may include, but not limited to, a sound alarm, a graphic alarm, or a vibration alarm.

Also, the object information stored in the storage space 711 may be a predetermined default value. For example, at the time of manufacturing the electronic device 2100, object information corresponding to sensing data may be previously stored in the storage space 711 for each sensor included in the electronic device 2100.

Figure 8:
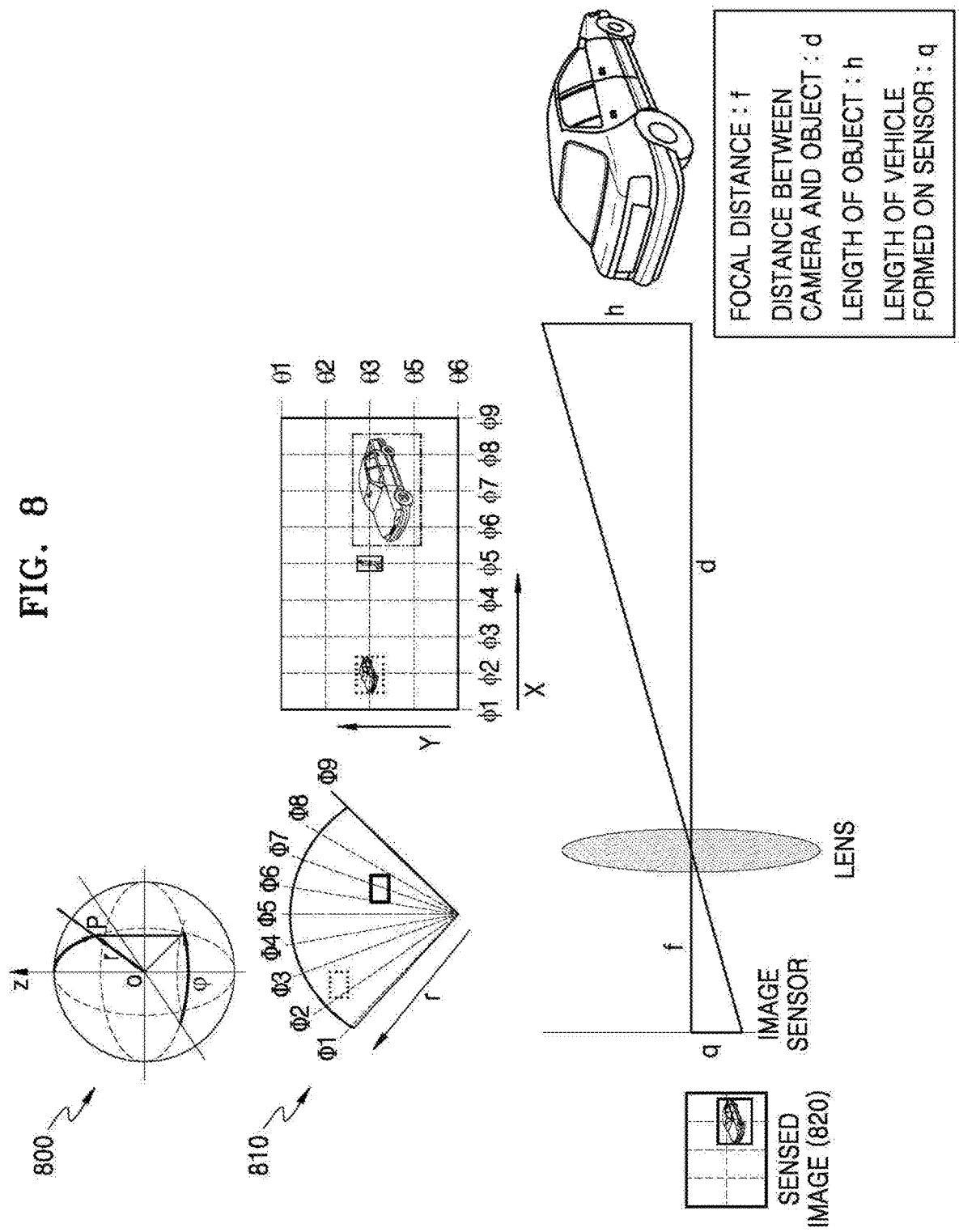
FIG. 8 is a diagram illustrating an example of converting position information coordinates included in object information recognized using second sensing data into position information coordinates for first sensing data, according to an embodiment of the present disclosure.

FIG. 8 is a diagram illustrating an example of converting position information coordinates included in object information recognized using second sensing data into position information coordinates for first sensing data according to an embodiment of the present disclosure.

Referring to FIG. 8, a position of an object in an image sensor may be represented as (x, y), and a position of the object in a distance sensor may be represented as (r, θ, φ)

(800). The image sensor may not represent a height of the object as a coordinate value, but the height of the object may be calculated through relationship between a focal distance, a distance between a camera and the object, an area of the object, and an area of the object formed on the sensor (810). Also, for example, a distance from the object in the distance sensor may be r, a horizontal axis value of an image in the image sensor may be x, and a vertical axis value of the image may be y.

According to an embodiment, when the position information coordinates are converted from the image sensor to the distance sensor, the position information coordinates may be converted using the following Equation 1.

$$r = \sqrt{x^2 + y^2 + z^2}$$
$$\theta = \arccos\frac{z}{r}$$
$$\phi = \arctan\frac{y}{x}$$

Equation 1

Further, for example, when the position information coordinates are converted from the distance sensor to the image sensor, the position information coordinates may be converted using the following Equation 2.

$$x = r \sin\theta \cos\phi$$
$$y = r \sin\theta \sin\phi$$
$$z = r \cos\theta$$

Equation 2

According to an embodiment, when a length of the object formed on the sensor in the image sensor is converted into an actual object length (820), the length may be converted using the following Equation 3.

$$H = q*d/f$$

(Length of object)=(Length of Object formed on Sensor)*(Distance Between Objects)/(Focal Distance)

Equation 3

For example, if the first sensor 2141 and the second sensor 2142 are both image sensors or distance sensors but have different view angles, the position information coordinates may be converted using a predetermined table for an angle of field corresponding to each view angle.

Also, for example, in the case where object sensing time are not identical according to sensors or a movement of the object or a sensor occurs during a sensing time difference, since the object at the same position is not sensed, position correction is necessary according to the sensing time. This will be described later in detail with reference to FIG. 18.

Figure 9:
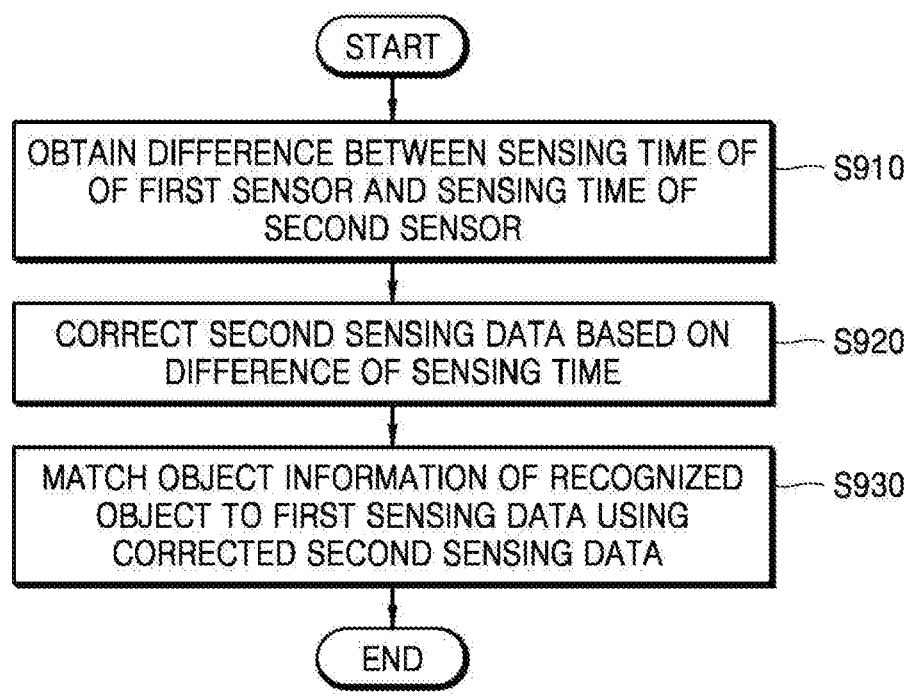
FIG. 9 is a detailed flowchart of a method of correcting second sensing data based on a difference between a sensing time of a first sensor and a sensing time of a second sensor, according to an embodiment of the present disclosure.

FIG. 9 is a detailed flowchart of a method of correcting second sensing data based on a difference between a sensing time of the first sensor 2141 and a sensing time of the second sensor 2142 according to an embodiment of the present disclosure.

Referring to FIG. 9, in operation S910 the electronic device 2100 may obtain the difference between the sensing time of the first sensor 2141 and the sensing time of the second sensor 2142. The difference of the sensing time may include, but not limited to, a difference of an angle of view and a difference of a sensing frame.

In operation S920, the electronic device 2100 may correct the second sensing data based on the difference of the sensing time. For example, the electronic device 2100 may compare a sensing frame difference between the first sensor 2141 and the second sensor 2142 to calculate an object moving speed with respect to a center position, and correct an expected position of an object that the second sensor 2142 may recognize at a sensing time of the first sensor 2141 using the difference of the sensing time and the object moving speed.

In operation S930, the electronic device 2100 may match object information of a recognized object to first sensing data using the corrected second sensing data.

Figure 10:
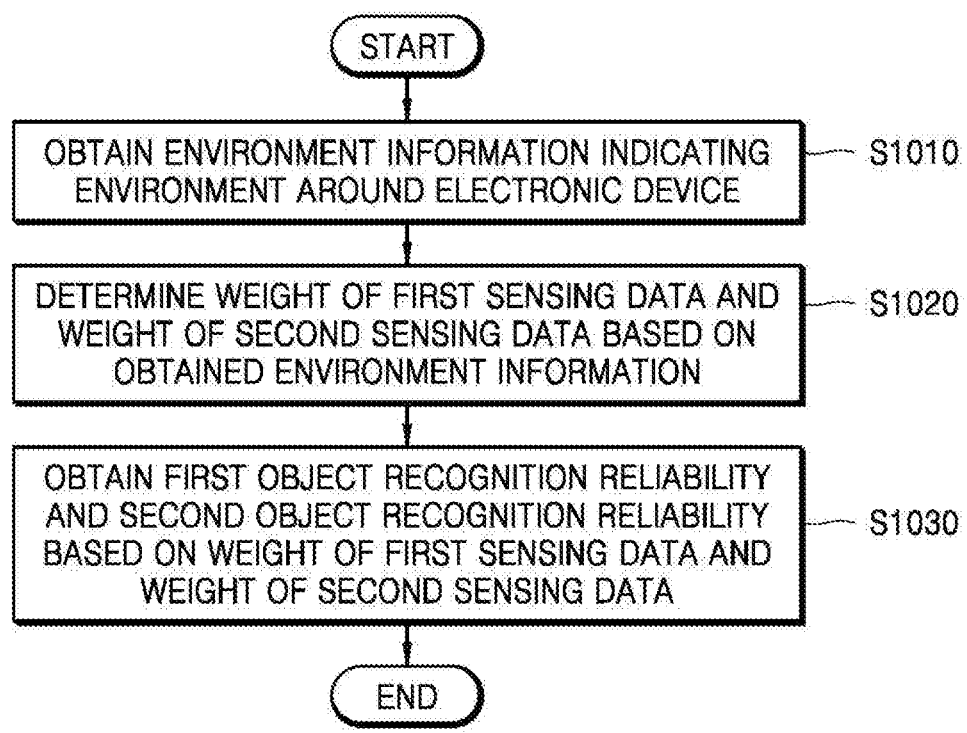
FIG. 10 is a detailed flowchart of a method in which an electronic device obtains environment information around the electronic device and determines weights of first sensing data and second sensing data based on the obtained environment information, according to an embodiment of the present disclosure.

FIG. 10 is a detailed flowchart of a method in which the electronic device 2100 obtains environment information around the electronic device 2100 and determines weights of first sensing data and second sensing data based on the obtained environment information according to an embodiment of the present disclosure.

Referring to FIG. 10, in operation S1010 the electronic device 2100 may obtain the environment information indicating an environment around the electronic device 2100. The environment information may be, but not limited to, illumination, snowfall, rainfall, a tunnel environment, or a corner environment that may affect for an image sensor and a distance sensor to recognize an object. The electronic device 2100 may obtain external environment information using only a sensor or from external information such as Internet information.

In operation S1020, the electronic device 2100 may determine the weight of the first sensing data and the weight of the second sensing data based on the obtained environment information. For example, a weight corresponding to the illumination applied to sensing data of a RGB camera may increase as the illumination increases. Also, for example, a weight corresponding to the rainfall applied to sensing data of a lidar may be reduced as the rainfall increases.

In operation S1030, the electronic device 2100 may obtain a first object recognition reliability and a second object recognition reliability based on the weight of the first sensing data and the weight of the second sensing data. For example, in case of high rainfall, although an object recognition reliability of the lidar may be degraded due to scattering noise, a more reliable object recognition reliability may be obtained by applying the weight according to rainfall.

The electronic device 2100 may calculate object recognition reliabilities by reflecting weights and compare the calculated object recognition reliabilities as described above but is not limited to this. The electronic device 2100 may calculate object recognition reliabilities and consider weights corresponding to the calculated object recognition reliabilities in order to compare the calculated object recognition reliabilities.

Figure 11:
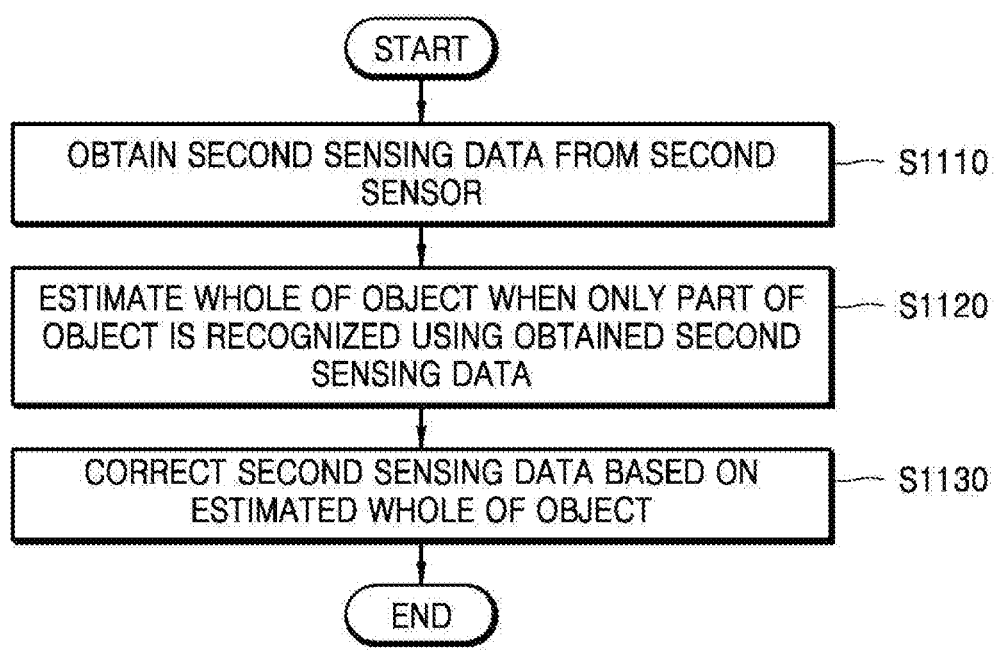
FIG. 11 is a detailed flowchart of a method of estimating a whole of an object when only a part of the object is recognized based on second sensing data and correcting the second sensing data based on the estimated whole of the object, according to an embodiment of the present disclosure.

FIG. 11 is a detailed flowchart of a method of estimating a whole of an object when only a part of the object is recognized based on second sensing data and correcting the second sensing data based on the estimated whole of the object according to an embodiment of the present disclosure.

Referring to FIG. 11, in operation S1110 the electronic device 2100 may obtain the second sensing data from the second sensor 2142.

In operation S1120, the electronic device 2100 may estimate the whole of the object even if only the part of the object is recognized using the obtained second sensing data. For example, if only the object having the recognized part is a wheel of a vehicle, a whole of the vehicle may be estimated using previously stored data.

In operation S1130, the electronic device 2100 may correct identification information indicating a type of the object in object information of the second sensing data based on the estimated whole of the object. For example, when the estimated whole of the object is the vehicle, the electronic device 2100 may correct position information of the second sensing data, which recognizes only the wheel that is a part of the vehicle, to a position of the whole of the vehicle. Also, for example, the electronic device 2100 may match at least one of object image data, identification information, and position information included in object information of the estimated object recognized using the corrected second sensing data to first sensing data and store the matched object information in a database of the first sensor 2141. Matching and storing may include selecting a part of the first sensing data corresponding to a position of the recognized object and storing identification information of the recognized object together with a part of the first sensing data in the database of the first sensor 2141 as object information. For example, the electronic device 2100 may classify and store a part of the first sensing data corresponding to the position of the object in the database as a recognition result of the first sensing data using position information of the estimated whole of the object. Alternatively, for example, the electronic device 2100 may update the estimated whole of the object and position information of the estimated whole of the object. Also, for example, the electronic device 2100 may update a part of the object other than the recognized part of the object and position information of the part of the object other than the recognized part of the object.

Figure 12:
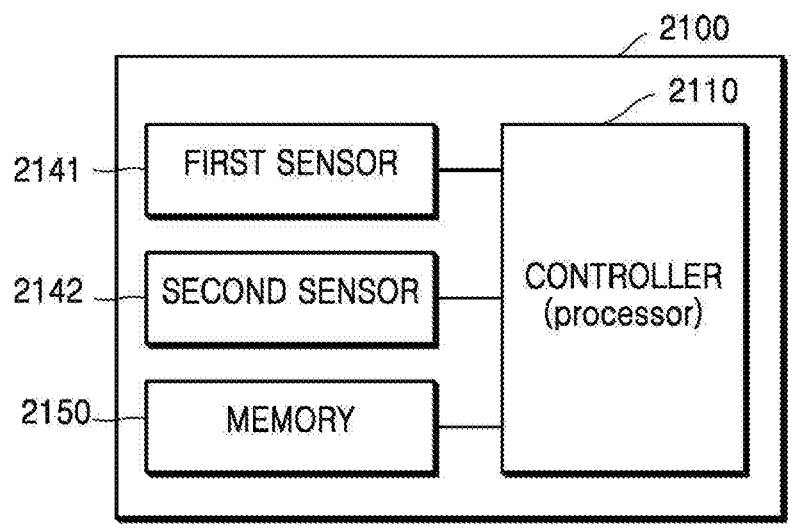
FIG. 12 is a diagram illustrating a configuration of an electronic device that recognizes an object, according to an embodiment of the present disclosure.

FIG. 12 is a diagram illustrating a configuration of the electronic device 2100 that recognizes an object according to an embodiment of the present disclosure.

Referring to FIG. 12, the electronic device 2100 that recognizes the object may include the controller 2110, the first sensor 2141, the second sensor 2142, and the memory 2150. However, the electronic device 2100 that recognizes the object may be implemented by more components than components shown in FIG. 12, or the electronic device 2100 that recognizes the object may be implemented by fewer components than the components shown in FIG. 12.

Referring to FIG. 12, an electronic device 2100 that recognizes the object may be configured to include the first sensor 2141 and the second sensor 2142 that obtain sensing data for the object around the electronic device 2100. Also, the electronic device 2100 that recognizes the object may be configured to include the controller 2110 that obtains a first object recognition reliability and a second object recognition reliability of first sensing data and second sensing data, matches object information of the recognized object to the first sensing data using the second sensing data obtained through the second sensor 2142 based on the first object recognition reliability and the second object recognition reliability and stores the matched object information in the memory 2150.

According to an embodiment, the memory 2150 may include a training database, an existing parameter database, or a parameter database for other sensor. The training database may store some sensed images or data obtained via a sensor. The existing parameter database may store parameters extracted from the training database. The parameter database for other sensor may store extracted parameters matching respective sensing data.

Figure 13:
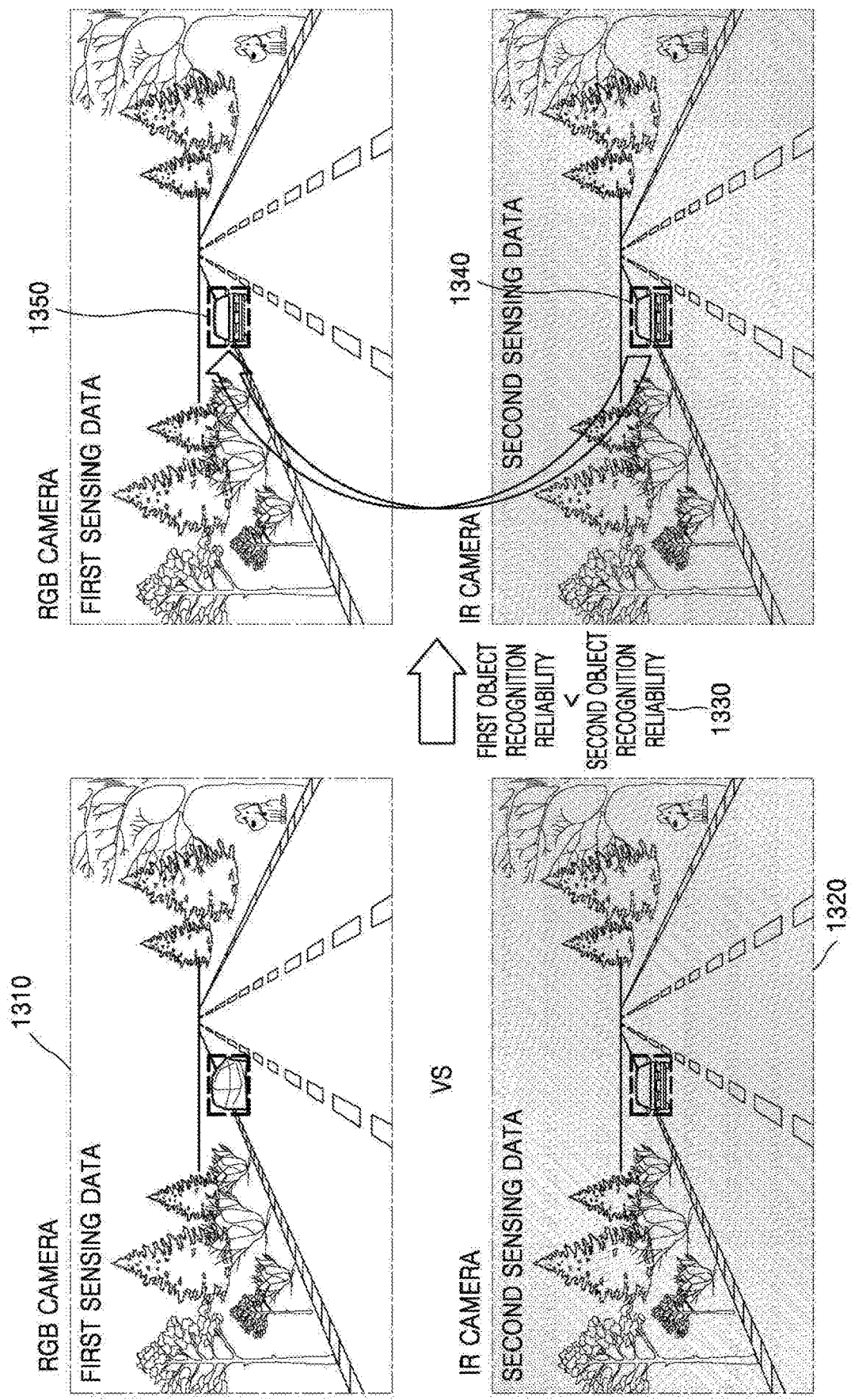
FIG. 13 is a diagram illustrating an example in which an electronic device recognizes an object depending on magnitudes of a first object recognition reliability and a second object recognition reliability, according to an embodiment of the present disclosure.

FIG. 13 is a diagram illustrating an example in which the electronic device 2100 recognizes an object depending on magnitudes of a first object recognition reliability and a second object recognition reliability according to an embodiment of the present disclosure.

Referring to FIG. 13, a RGB camera, as the first sensor 2141, may obtain first sensing data 1310 and an IR camera, as the second sensor 2142, may obtain second sensing data 1320. When the first sensor 2141 recognizes the object as rock in the first sensing data 1310 and the second sensor 2142 recognizes the object as a vehicle in the second sensing data 1320, a controller may obtain the first object recognition reliability and the second object recognition reliability of the first sensing data 1310 and the second sensing data 1320. The controller may determine the magnitudes of the first object recognition reliability and the second object recognition reliability. If the controller determines that the first object recognition reliability is smaller than the second object recognition reliability (1330), the controller may match object information 1350 of the recognized object using the second sensing data 1320 to the first sensing data 1310, and store the matched object information 1350 in a database of the RGB camera as the first sensor 2141. Matching and storing may include selecting a part of the first sensing data 1310 corresponding to a position of the recognized object and storing identification information of the recognized object together with a part of the first sensing data 1310 in the database of the RGB camera as object information. Alternatively, the controller may store parameters extracted using feature values of the recognized object (e.g., the matched object information 1340) using the IR camera in the database of the RGB camera.

However, as described above, when the electronic device 2100 determines that the first object recognition reliability of the first sensing data 1310 obtained from the first sensor 2141 and the second object recognition reliability of the second sensing data 1320 obtained from the second sensor 2142 are less than a third threshold value, the electronic device 2100 may not extract and store parameters corresponding to feature values of the first sensing data 1310 obtained from the first sensor 2141 and the second sensing data 1320 obtained from the second sensor 2142 in the database of each of the first sensor 2141 and the second sensor 2142 irrespective of the magnitudes of the first object recognition reliability and the second object recognition reliability. Meanwhile, the electronic device 2100 may determine whether objects recognized by the first sensing data 1310 obtained by the first sensor 2141 as the RGB camera and the second sensing data 1320 obtained by the second sensor 2142 as the IR camera are the same. If it is determined that the objects recognized by the first sensing data 1310 and the second sensing data 1320 are the same, the electronic device 2100 may not extract and store parameters corresponding to feature values of the first sensing data 1310 and the second sensing data 1320 obtained from the first sensor 2141 and the second sensor 2142 in the respective database of the first sensor 2141 and the second sensor 2142 irrespective of the magnitudes of the first object recognition reliability and the second object recognition reliability. Alternatively, when it is determined that the objects recognized by the first sensing data 1310 and the second sensing data 1320 are the same, the electronic device 2100 may not match and store information obtained from the first sensor 2141 and the second sensor 2142 irrespective of the magnitudes of the first object recognition reliability and the second object recognition reliability.

Figure 14:
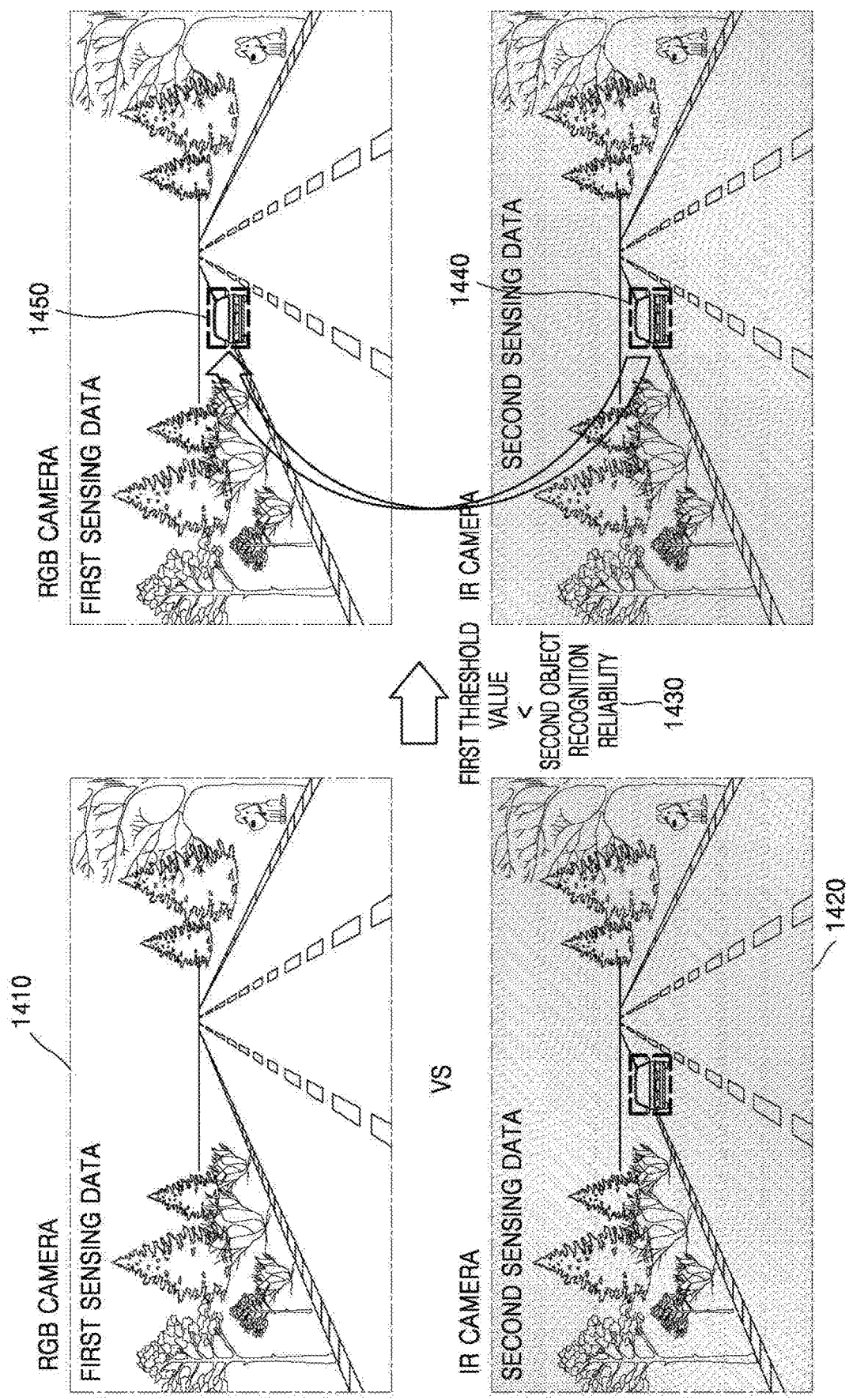
FIG. 14 is a diagram illustrating another example in which an electronic device recognizes an object depending on magnitudes of a first object recognition reliability and a second object recognition reliability, according to an embodiment of the present disclosure.

Referring to FIG. 14, an RGB camera, as the first sensor 2141, may obtain first sensing data 1410, and an IR camera, as the second sensor 2142, may obtain second sensing data 1420. For example, a controller may determine whether a second object recognition reliability is equal to or greater than a predetermined first threshold value (1430). The predetermined first threshold value may be a value indicating that accuracy or recognition reliability of sensing data is equal to or higher than a predetermined reference. For example, when the second object recognition reliability is equal to or greater than the predetermined first threshold value, the controller may determine that the second sensing data 1420 has a minutia, and even if the object is not recognized in the first sensing data 1410, the controller may estimate information about the object corresponding to the second sensing data 1420 with a high reliability. When the controller determines that the second object recognition reliability is higher than the first threshold value (1430), the controller may match object information 1440 of the recognized object to the first sensing data 1410 using the second sensing data 1420, and store matched object information 1450 in a database of the RGB camera as the first sensor 2141. Matching and storing may include selecting a part of the first sensing data 1410 corresponding to a position of the recognized object and storing identification information of the recognized object together with a part of the first sensing data 1410 in the database of the RGB camera as object information. Alternatively, the controller may store parameters extracted using feature values of the recognized object using the IR camera in the database of the RGB camera.

However, as described above, when the electronic device 2100 determines that the first object recognition reliability of the first sensing data 1410 obtained from the first sensor 2141 and the second object recognition reliability of the second sensing data 1420 obtained from the second sensor 2142 are less than a third threshold value, the electronic device 2100 may not extract and store parameters corresponding to feature values of the first sensing data 1410 obtained from the first sensor 2141 and the second sensing data 1420 obtained from the second sensor 2142 in the database of each of the first sensor 2141 and the second sensor 2142 irrespective of magnitudes of the first object recognition reliability and the second object recognition reliability.

Figure 15:
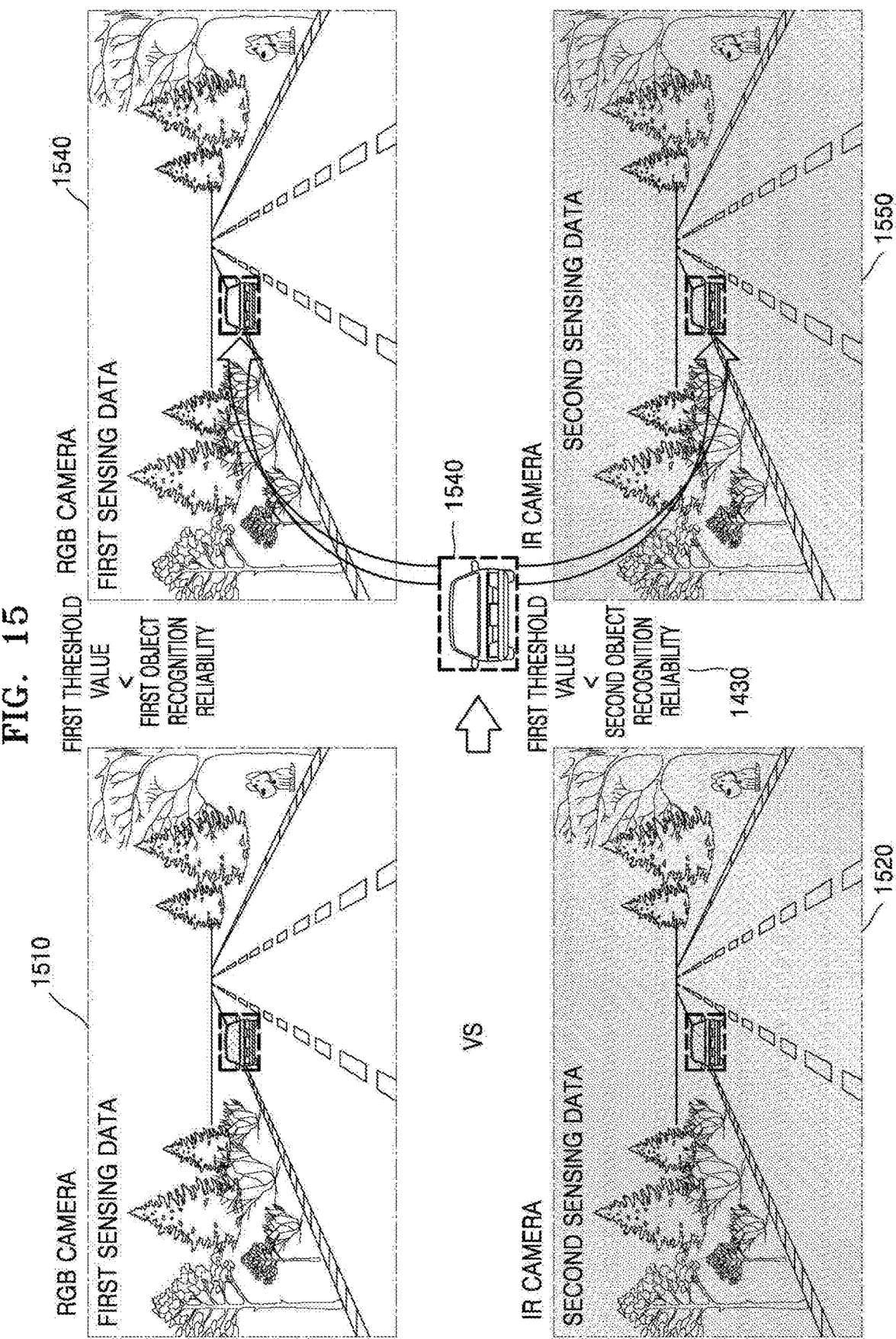
FIG. 15 is a diagram illustrating an example in which an electronic device recognizes an object depending on magnitudes of a first object recognition reliability, a second object recognition reliability, and a second threshold value, according to an embodiment of the present disclosure.

FIG. 15 is a diagram illustrating an example in which the electronic device 2100 recognizes an object depending on magnitudes of a first object recognition reliability, a second object recognition reliability, and a second threshold value according to an embodiment of the present disclosure.

Referring to FIG. 15, an RGB camera, as the first sensor 2141, may obtain first sensing data 1510, and an IR camera, as the second sensor 2142, may obtain second sensing data 1520. A controller may determine whether the first object recognition reliability and the second object recognition reliability are less than the predetermined second threshold value (1530). The predetermined second threshold value may be a value used to determine that the object is not recognized if an object recognition reliability is less than a predetermined value. For example, if the second object recognition reliability is less than the predetermined second threshold value, the controller may determine that there is no object in the second sensing data 1520. If the controller determines that the first object recognition reliability and the second object recognition reliability are less than the second threshold value (1530), the controller may match object information 1540 of the recognized object using the first sensing data 1510 and the second sensing data 1520 together to each of the first sensing data 1510 and the second sensing data 1520. The controller may store the matched object information 1540 in a database of the RGB camera as the first sensor 2141 and a database of the IR camera as the second sensor 2142. Matching and storing may include selecting a part of the first sensing data 1510 corresponding to a position of the recognized object and storing identification information of the recognized object together with a part of the first sensing data 1510 in the database of the RGB camera as object information. Alternatively, the controller may store parameters extracted using feature values of the recognized object using the IR camera and the RGB camera in the databases of the IR camera and the RGB camera.

Referring to FIG. 15, the controller may obtain a third object recognition reliability of the object information 1540 of the recognized object by using the first sensing data 1510 and the second sensing data 1520 together. Also, the controller may determine whether the third object recognition reliability is equal to or greater than the above predetermined first threshold value. When the controller determines that the third object recognition reliability is higher than the first threshold value, the controller may match the object information 1540 of the recognized object using the first sensing data 1510 and the second sensing data 1520 together to each of the first sensing data 1510 and the second sensing data 1520 and store the matching object information 1540 in the database of the IR camera as the first sensor 2141 as the database of the RGB camera as the second sensor 2142. Alternatively, the controller may store extracted parameters using feature values of the recognized object using the IR camera and the RGB camera in the databases of the IR camera and the RGB camera.

However, as described above, when the electronic device 2100 determines that the first object recognition reliability of the first sensing data 1510 obtained from the first sensor 2141 and the second object recognition reliability of the second sensing data 1520 obtained from the second sensor 2142 are less than a third threshold value, the electronic device 2100 may not extract and store parameters corresponding to feature values of the first sensing data 1510 obtained from the first sensor 2141 and the second sensing data 1520 obtained from the second sensor 2142 in the database of each of the first sensor 2141 and the second sensor 2142 irrespective of the magnitudes of the first object recognition reliability and the second object recognition reliability of the obtained first sensing data 1510 and second sensing data 1520.

Figure 16:
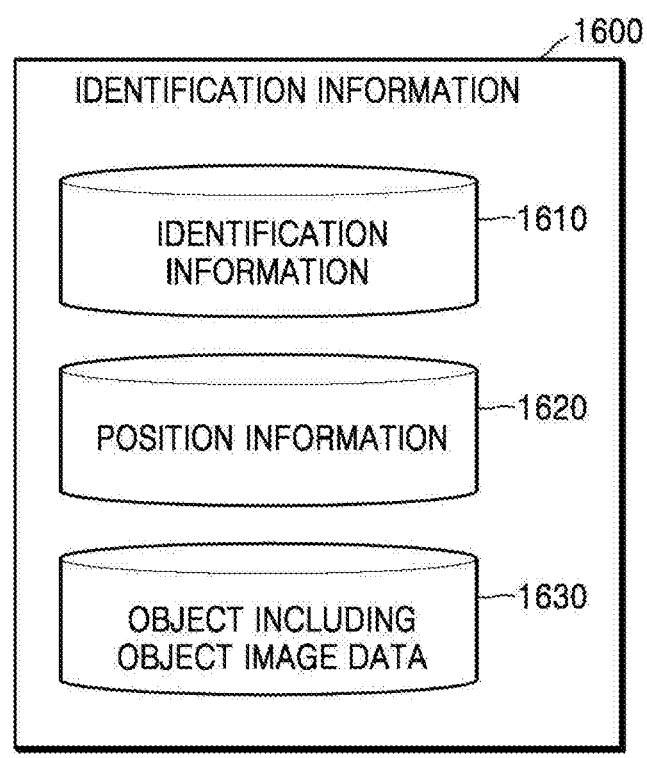
FIG. 16 is a diagram illustrating an example of object information of an object including object image data, identification information of the object, and position information of the object, according to an embodiment of the present disclosure.

FIG. 16 is a diagram illustrating an example of object information 1600 of an object including object image data 1630, identification information 1610 of the object, and position information 1620 of the object according to an embodiment of the present disclosure.

Referring to FIG. 16, the object information 1600 may include the identification information 1610 indicating a type of the object, the position information 1620 indicating a relative position of the object recognized around the electronic device 2100, and the object image data 1630 extracted from sensing data obtained by a sensor. For example, a controller may use the position information 1620 to match a portion of the first sensing data corresponding to the position of the object with a part of first sensing data corresponding to the position of the object to a part of second sensing data corresponding to the position of the object and classify and store a recognition result of the matched first sensing data in a database. Further, the controller may match at least one of the identification information 1610, the position information 1620, and the object image data 1630 included in the object information 1600 to sensing data and store the matched sensing data in a database of the sensor.

Figure 17:
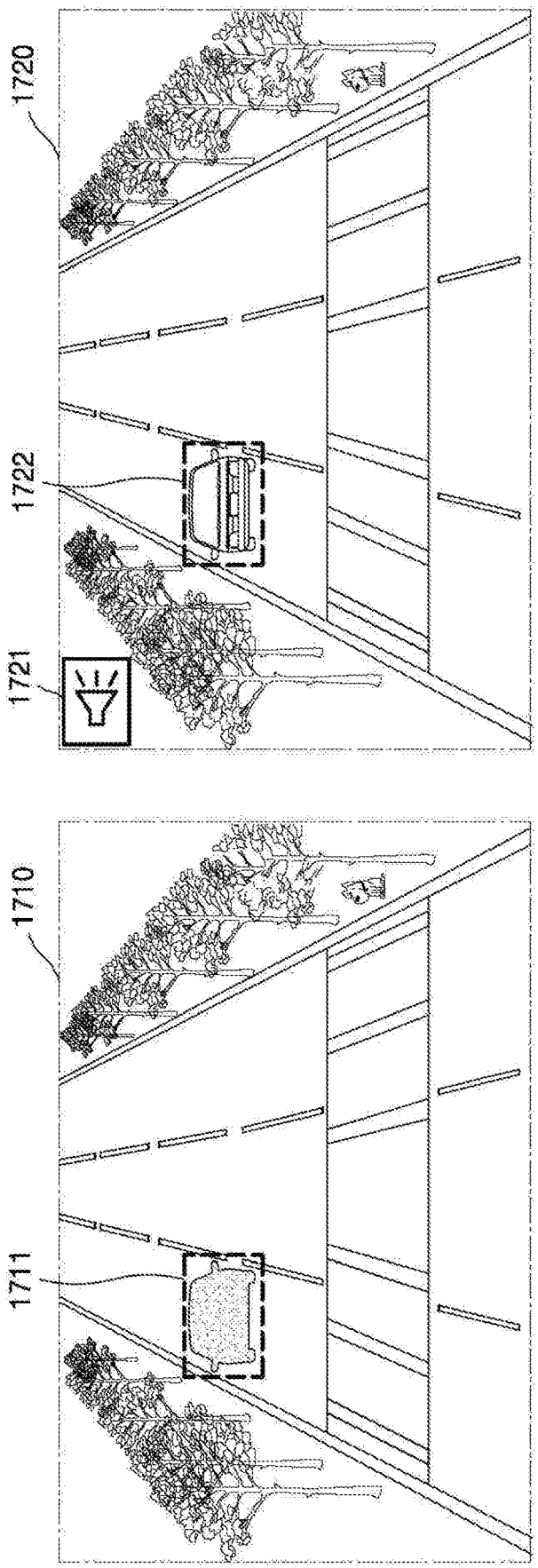
FIG. 17 is a diagram illustrating an example in which object information of an object recognized using second sensing data is separately stored in a database of a first sensor to generate different alarms, according to an embodiment of the present disclosure.

FIG. 17 is a diagram illustrating an example in which object information of an object recognized using second sensing data is separately stored in a database of the first sensor 2141 to generate different alarms according to an embodiment of the present disclosure.

Referring to FIG. 17, when the object information of the object recognized using the second sensing data is matched to first sensing data and is separately stored in the database of the first sensor 2141, the electronic device 2100 may store the matched and stored object information differently from previously stored object information such that alarms may be different for an object recognized by using the previously stored object information and the object recognized using the second sensing data. For example, when the first sensor 2141 does not recognize the object and the second sensor 2142 recognizes a position and a shape of the object, the electronic device 2100 may display position information and the shape of the object on a display 1710 in a graphic alarm 1711. Meanwhile, when both the first sensor 2141 and the second sensor 2142 recognize the position and a type of the object, the electronic device 2100 may display a graphic alarm 1722 indicating the position and the type of the object, and additionally a sound alarm 1721 on a display 1720.

Figure 18:
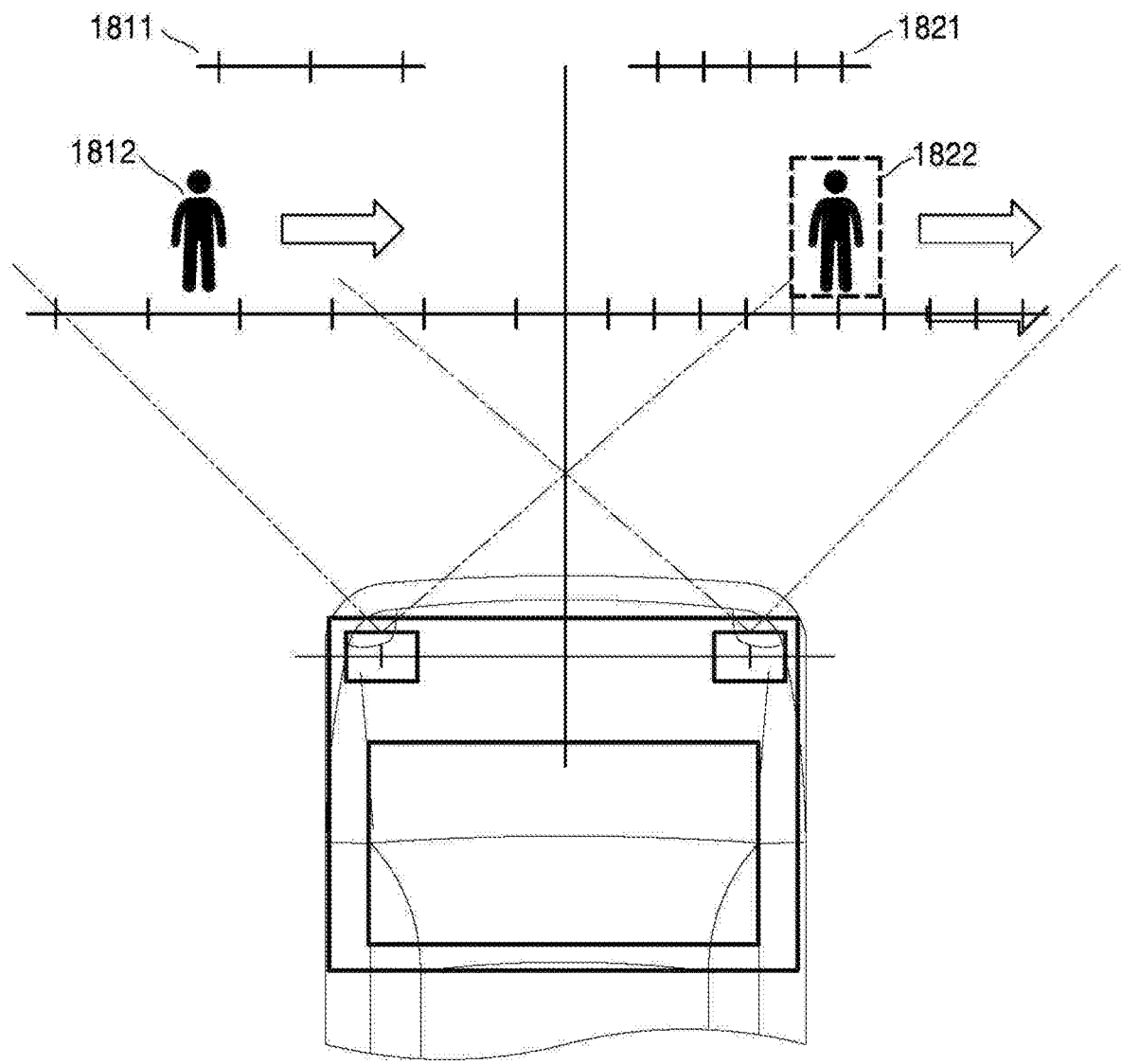
FIG. 18 illustrates an example in which an electronic device recognizing an object obtains a difference in a sensing time of a first sensor and a sensing time of a second sensor, and corrects second sensing data depending on the difference in the sensing time, according to an embodiment of the present disclosure.

FIG. 18 illustrates an example in which the electronic device 2100 recognizing an object 1812 obtains a difference in a sensing time of the first sensor 2141 and a sensing time of the second sensor 2142, and corrects second sensing data depending on the difference in the sensing time according to an embodiment of the present disclosure.

Referring to FIG. 18, the controller 2110 may obtain the difference in the sensing time between a sensing frame 1811 of the first sensor 2141 and a sensing frame 1821 of the second sensor 2142. For example, if a sensing frame interval of a lidar is 10 ms and a sensing frame interval of an RGB camera is 33 ms, there may be a difference in a sensing time due to a difference in a sensing frame interval between sensing data of the lidar and sensing data of the RGB camera. The controller 2110 may also calculate a moving speed of the object 1812 with respect to a center position of the electronic device 2100 based on the difference in the sensing time between the sensing frame 1811 of the first sensor 2141 and the sensing frame 1821 of the second sensor 2142. The controller 2110 may also correct an estimated position 1822 of the object 1812 that the second sensor 2142 may recognize at the sensing time of the first sensor 2141 using the calculated moving speed of the object 1812 and the difference in the sensing time.

According to an embodiment, the controller 2110 may collect additional information as well as the moving speed of the object 1812 to correct the estimated position 1822 of the object 1812.

According to an embodiment, the controller 2110 may control an operation of a sensor to recognize the object 1812. For example, when there is the non-detected object 1812 having a low recognition reliability by the first sensor 2141, the controller 2110 may complementarily control an operation of the second sensor 2142 to assist in identifying the non-detected object 1812. For example, when the second sensor 2142 is an image sensor, the controller 2110 may control the second sensor 2142 to zoom in a corresponding position part such that the second sensor 2142 may easily recognize the non-detected object 1812. Also, for example, when the second sensor 2142 is a distance sensor, the controller 2110 may narrow an angle of view of the second sensor 2142 in order to increase resolution of the second sensor 2142. For example, complementary control may include, but not limited to, tilt, zoom-in, zoom-out, or control of angle of view.

FIG. 19 is a diagram of an example of an environment factor considered in determining a weight for object recognition reliability according to an embodiment of the present disclosure.

Referring to FIG. 19, a sensor is an RGB camera, the environment factor that affects object identification may be illumination and snowfall. Also, for example, if the sensor is one of an IR camera, a thermal imaging camera, and a lidar, the environmental factor that affects object identification may be rainfall. Also, for example, if the sensor is an ultrasonic sensor, the environmental factor that affects object identification may be a tunnel or a corner region.

Figure 20:
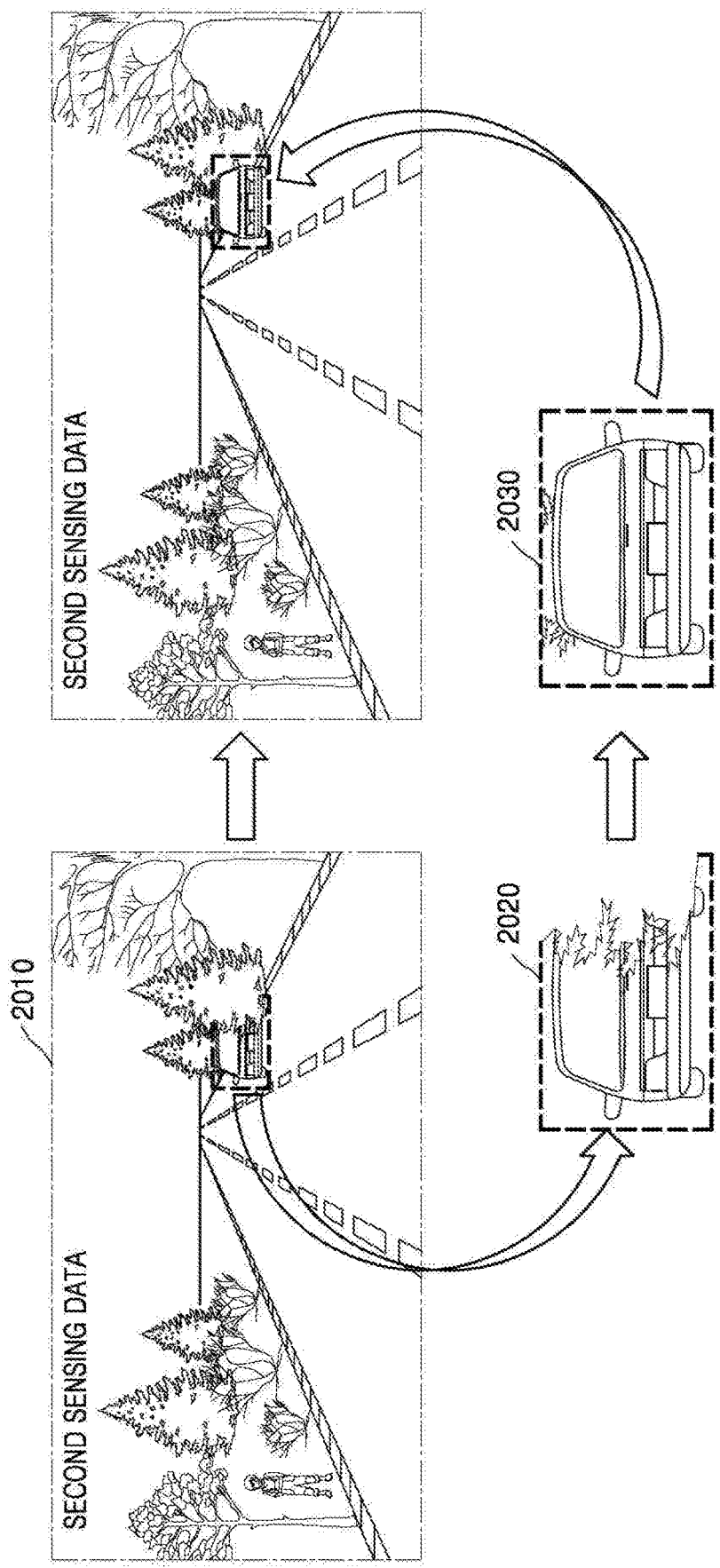
FIG. 20 illustrates an example of estimating a whole of an object when only a part of the object is recognized based on second sensing data and correcting the second sensing data based on the estimated whole of the object, according to an embodiment of the present disclosure.

FIG. 20 illustrates an example of estimating a whole 2030 of an object when only a part 2020 of the object is recognized based on second sensing data 2010 and correcting the second sensing data 2010 based on the estimated whole of the object according to the embodiment of the present disclosure.

Referring to FIG. 20, when a controller recognizes only the part 2020 of the object in the second sensing data 2010 of the second sensor 2142, the controller may estimate the whole 2030 of the object based on the recognized part 2020 of the object. Also, the controller may correct a part of the second sensing data 2010 corresponding to the object based on the estimated whole 2030 of the object. Also, the controller may match at least one of object image data, identification information, and position information included in object information of the estimated object recognized using the corrected second sensing data 2010 to first sensing data and store the matched first sensing data in a database of the first sensor 2141.

For example, when the first sensor 2141 is a lidar and the second sensor 2142 is an RGB camera, only a part of the object is recognized by the lidar, but the RGB camera fails to recognize the object, the lidar may estimate a size of the object based on position information of the recognized object and the recognized part of the object and transmit the position information to a sensing image of the RGB camera.

In the above example, the electronic device 2100 uses a plurality of pieces of sensing data to recognize one object, but is not limited thereto.

For example, when a plurality of objects are recognized for user authentication, sensing data for each of the plurality of objects may be complementary to each other. For example, reliability of user authentication may be calculated by integrating object recognition reliability of the sensing data for each of the plurality of objects to determine whether a user has been authenticated. For example, the sensing data for the plurality of objects may include, but not limited to, iris recognition data or fingerprint recognition data.

Figure 21:
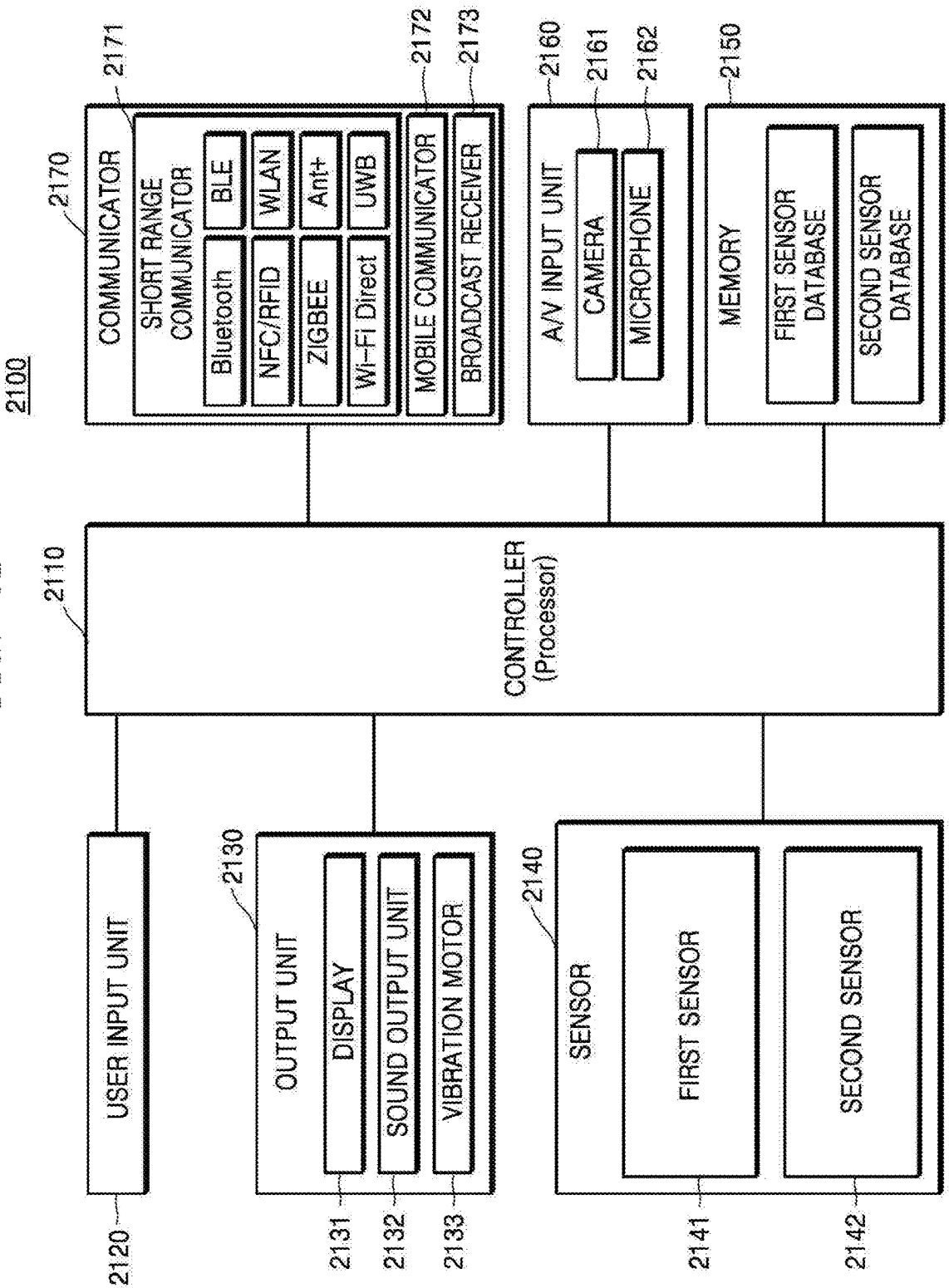
FIG. 21 is a detailed block diagram illustrating an example of an electronic device that recognizes an object, according to an embodiment of the present disclosure.

FIG. 21 is a detailed block diagram illustrating an example of the electronic device 2100 that recognizes an object according to an embodiment of the present disclosure.

Referring to FIG. 21, the electronic device 2100 that recognizes the object according to some embodiments may further include the controller 2110, a user input unit 2120 (e.g., a user input device), an output unit 2130 (e.g., a user output device), a sensor 2140, a communicator 2170 (e.g., a transceiver), an audio/video (A/V) input unit 2160 (e.g., an A/V input device), and the memory 2150.

The controller 2110 may typically control overall operations of the electronic device 2100 described above. For example, the controller 2110 may obtain object recognition reliability by processing sensing data obtained by the sensor 2140, match object information to the sensing data based on the object recognition reliability, and store the matched object information in a database of a sensor. The controller 2110 may also execute programs stored in the memory 2150 to control the user input unit 2120, the output unit 2130, the sensor 2140, the communicator 2170, and the A/V input unit 2160. The controller 2110 may also control at least one of the user input unit 2120, the output unit 2130, the sensor 2140, the communicator 2170, and the A/V input unit 2160 such that operations of the electronic device 2100 of FIGS. 1 through 20 may be performed.

The user input unit 2120 means a unit for inputting data for controlling the electronic device 2100 in which a user recognizes the object. For example, the user input unit 2120 may include a key pad, a dome switch, a touch pad (contact type capacitance type, pressure type resistive type, infrared ray detection type, surface ultrasonic wave conduction type, a tension measuring method, a piezo effect type, etc.), a jog wheel, a jog switch, and the like, but is not limited thereto.

The output unit 2130 may output an audio signal, a video signal or a vibration signal and may include a display 2131, a sound output unit 2132, and a vibration motor 2133.

The display 2131 may display and output information processed by the electronic device 2100 that recognizes the object. For example, the display 2131 may display the object information matched to first sensing data together with the first sensing data.

Meanwhile, when the display 2131 and a touch pad have a layer structure and are configured as a touch screen, the display 2131 may be used as an input device in addition to an output device. The display 2131 may include at least one of a liquid crystal display, a thin film transistor-liquid crystal display, an organic light-emitting diode, a flexible display, a three-dimensional (3D) display, and electrophoretic display. The electronic device 2100 that recognizes the object may include two or more displays 2131 according to an implementation of the electronic device 2100 that recognizes the object. At this time, the two or more displays 2131 may be arranged to face each other using a hinge.

The sound output unit 2132 may output a sound signal related to a function (e.g., an object information notification sound) performed in the electronic device 2100 that recognizes the object. The sound output unit 2132 may include a speaker, a buzzer, and the like.

The vibration motor 2133 may output a vibration signal. For example, the vibration motor 2133 may output a vibration signal corresponding to a type of sensing data to be matched. The vibration motor 2133 may also output a vibration signal when a touch is input to the touch screen.

The sensor 2140 may sense a state around the electronic device 2100 that recognizes the object and may transmit sensed information to the controller 2110.

The sensor 2140 may include at least one of an RGB camera, an IR camera, a thermal imaging camera, a lidar, a radar, an ultrasonic wave, and an IR sensor, but is not limited thereto. A function of each sensor may be intuitively deduced from the name by one of ordinary skill in the art, and thus a detailed description thereof will be omitted.

The communicator 2170 may include one or more components that allow communication between the electronic device 2100 that recognizes the object and a server or a peripheral device. For example, the communicator 2170 may include a short-range communicator 2171, a mobile communicator 2172, and a broadcast receiver 2173.

The short-range wireless communicator 2171 may include at least one of a Bluetooth communicator, a bluetooth low energy (BLE) communicator, a near field communicator, a wireless land area network (WLAN) communicator (e.g., Wi-Fi communicator), a zigbee communicator, an infrared data association (IrDA) communicator, a Wi-Fi Direct (WFD) communicator, an ultra-wideband (UWB) communicator, and an Ant+ communicator, etc. but is not limited thereto.

The mobile communicator 2172 may transmit and receive a radio signal to and from at least one of a base station, an external terminal, and a server over a mobile communication network. Here, the radio signal may include a voice call signal, a video call signal, or various types of data depending on a text/multimedia message transmission/reception.

The broadcast receiver 2173 may receive broadcast signals and/or broadcast-related information from outside via a broadcast channel. The broadcast channel may include a satellite channel and a terrestrial channel. The electronic device 2100 that recognizes the object may not include the broadcast receiver 2173 according to an implementation.

The audio/video (A/V) input unit 2160 is for inputting an audio signal or a video signal, and may include a camera 2161, a microphone 2162, and the like. The camera 2161 may obtain an image frame such as a still image or a moving image through an image sensor in a video communication mode or a capturing mode. An image captured through the image sensor may be processed through the controller 2110 or a separate image processor (not shown).

The image frame processed by the camera 2161 may be stored in the memory 2150 or transmitted to the outside through the communicator 2170. More than two cameras 2161 may be provided according to a configuration of a terminal.

The microphone 2162 may receive and process an external sound signal as electrical voice data. For example, the microphone 2162 may receive sound signals from an external device or a speaker. The microphone 2162 may use various noise reduction algorithms to remove noise generated in receiving the external sound signal.

The memory 2150 may store a program for processing and controlling the controller 2110 and may store data input to or output from the electronic device 2100 that recognizes the object.

The memory 2150 may include at least one type of storage medium of a flash memory type, a hard disk type, a multimedia card micro type, a card type memory (e.g., secure digital (SD) or extreme digital (XD) memory), a random-access memory (RANI), static random-access memory (SRAM), read only memory (ROM), electrically erasable programmable read-only memory (EEPROM), programmable read-only memory (PROM), magnetic memory, a magnetic disc, and an optical disc.

Figure 22:
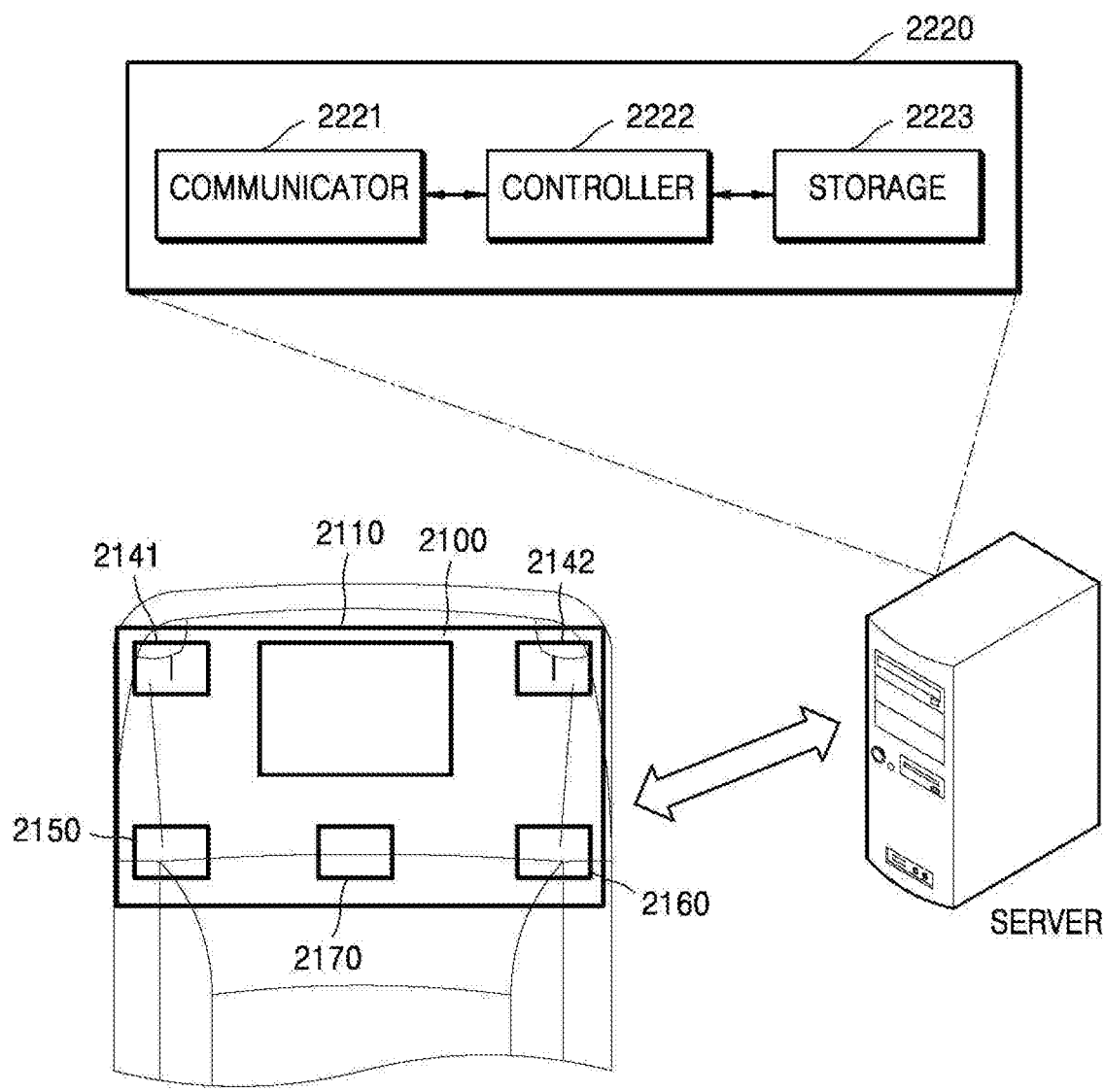
FIG. 22 is a diagram illustrating an example of a server that recognizes an object, according to an embodiment of the present disclosure.

FIG. 22 is a diagram illustrating an example of a server 2220 that recognizes an object according to an embodiment of the present disclosure.

Referring to FIG. 22, the electronic device 2100 that recognizes the object may include the communicator 2170 that may transmit first sensing data and second sensing data obtained from the first sensor 2141 and the second sensor 2142 to the server 2220. A communicator 2221 of the server 2220 may receive the first sensing data and the second sensing data transmitted by the communicator 2170 of the electronic device 2100 that recognizes the object. A controller 2222 of the server 2220 may obtain a first object recognition reliability and a second object recognition reliability for the object based on the received first and second sensing data. The controller 2222 of the server 2220 may match object information of the recognized object to the first sensing data using the second sensing data based on the obtained first and second object recognition reliabilities. The controller 2222 of the server 2220 may store the object information of the recognized object in a storage 2223 of the server 2220 using the second sensing data matched to the first sensing data. Alternatively, the controller 2222 of the server 2220 may transmit the object information of the recognized object to the electronic device 2100 that recognizes the object through the communicator 2221 using the second sensing data matched to the first sensing data, and store the object information in a database of the first sensor 2141. The storage 2223 of the server 2220 may store the object information matched to each of the first and second sensing data and may transmit the object information to the electronic device 2100 that recognizes another object through the communicator 2221 in response to a request from the controller 2222.

According to an embodiment, the electronic device 2100 that recognizes the object may store the sensing data obtained from each sensor in the memory 2150 and transmit the sensing data to the server 2220 at once. For example, the server 2220 may update a database of a vehicle that includes the electronic device 2100, and may update a database of the other vehicle.

According to the present disclosure, matched object information may be stored in a database of a first sensor, which may result in successful object recognition without any additional correction operation of an existing sensor later.

Some embodiments may also be implemented in the form of a recording medium including instructions executable by a computer, such as program modules, being executed by a computer. Computer readable recording medium may be any available media that may be accessed by a computer, and may include all volatile and nonvolatile media, removable and non-removable media. The computer readable recording medium may also include computer storage medium. The computer storage medium may include all volatile and nonvolatile media, removable and non-removable media that re implemented using any method or technology for storage of information such as computer readable instructions, data structures, program modules or other data.

The non-transitory computer-readable recording media may be distributed over network coupled computer systems, and data stored in the distributed recording media, e.g., a program command and code, may be executed by using at least one computer.

It is to be understood that the foregoing description of the disclosure is for the purpose of illustration only and that those of ordinary skill in the art will readily understand that various changes in form and details may be made without departing from the spirit or essential characteristics of this disclosure. It is therefore to be understood that the above-described embodiments are illustrative in all aspects and not restrictive. For example, each component described as a single entity may be distributed and implemented, and components described as being distributed may also be implemented in a combined form.

It should be understood that embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. A method of recognizing an object, the method performed by an electronic device and comprising:
    obtaining first sensing data from a first sensor that senses the object;
    obtaining second sensing data from a second sensor that senses the object;
    obtaining a first object recognition reliability for the object and a second object recognition reliability for the object respectively based on the first sensing data and the second sensing data;
    based on the first object recognition reliability and the second object recognition reliability, matching object information of the object recognized using the second sensing data to the first sensing data; and
    storing the matched object information in a database of one of the first sensor and the second sensor,
    wherein the matching of the object information comprises comparing the first object recognition reliability and the second object recognition reliability, and
    wherein when the first object recognition reliability is smaller than the second object recognition reliability, matching the object information of the object recognized using the second sensing data to the first sensing data.

2. The method of claim 1, wherein the matching of the object information comprises:
    determining whether the second object recognition reliability is equal to or greater than a predetermined first threshold value; and
    when the second object recognition reliability is equal to or greater than the predetermined first threshold value, matching the object information of the object recognized by using the second sensing data to the first sensing data.

3. The method of claim 1, wherein the matching of the object information comprises:
    determining whether the first object recognition reliability and the second object recognition reliability are less than a predetermined second threshold; and
    when the first object recognition reliability and the second object recognition reliability are less than the predetermined second threshold, matching object information of the object recognized by using the first sensing data and the second sensing data together to each of the first sensing data and the second sensing data.

4. The method of claim 1, wherein the matching of the object information comprises:
    determining whether the first object recognition reliability and the second object recognition reliability are equal to or greater than a predetermined third threshold value; and
    when the first object recognition reliability and the second object recognition reliability are equal to or greater than the predetermined third threshold value, performing the matching.

5. The method of claim 1,
    wherein the object information comprises at least one of object image data of the object, identification information of the object, or position information indicating a position of the object with respect to the electronic device, and
    wherein the matching of the object information comprises matching at least one of the object image data, the identification information, or the position information.

6. The method of claim 1, wherein the object information matched to the first sensing data is distinguished from predetermined object information previously stored in the database of the first sensor.

7. The method of claim 1,
wherein the matching of the object information comprises:
converting position information coordinates included in the object information recognized by using the second sensing data into position information coordinates for the first sensing data; and
matching the converted position information coordinates to the first sensing data, and
wherein the storing of the matched object information comprises storing the matched position information coordinates.

8. The method of claim 1, further comprising:
obtaining a difference between a sensing time of the first sensor and a sensing time of the second sensor; and
correcting the second sensing data based on the difference in the sensing time,
wherein the matching of the object information comprises matching object information of the object recognized by using the corrected second sensing data to the first sensing data and the storing comprises storing the matched object information.

9. The method of claim 1, further comprising:
obtaining environment information indicating an environment around the electronic device; and
determining a weight of the first sensing data and a weight of the second sensing data based on the obtained environment information,
wherein the obtaining of the first object recognition reliability and the second object recognition reliability comprises obtaining the first object recognition reliability and the second object recognition reliability based on the determined weight of the first sensing data and the determined weight of the second sensing data respectively.

10. The method of claim 1, wherein the obtaining of the second sensing data from the second sensor comprises:
estimating a whole of the object when only a part of the object is recognized based on the second sensing data; and
using the estimated whole of the object to correct the second sensing data.

11. A device for recognizing an object, the device comprising:
a first sensor configured to obtain first sensing data of the object sensed by the first sensor;
a second sensor configured to obtain second sensing data of the object sensed by the second sensor; and
at least one processor configured to:
obtain a first object recognition reliability for the object and a second object recognition reliability for the object respectively based on the first sensing data and the second sensing data,
based on the first object recognition reliability and the second object recognition reliability, match object information of the object recognized by using the second sensing data to the first sensing data,
determine magnitudes of the first object recognition reliability and the second object recognition reliability, and
when the first object recognition reliability is smaller than the second object recognition reliability, match the object information of the object recognized by using the second sensing data to the first sensing data and store the matched object information, and
store the matched object information in a database of one of the first sensor and the second sensor.

12. The device of claim 11, wherein the at least one processor is further configured to:
determine whether the second object recognition reliability is equal to or greater than a predetermined first threshold value, and
when the second object recognition reliability is equal to or greater than the predetermined first threshold value, match the object information of the object recognized by using the second sensing data to the first sensing data and store the matched object information.

13. The device of claim 11, wherein the at least one processor is further configured to:
determine whether the first object recognition reliability and the second object recognition reliability are less than a predetermined second threshold, and
when the first object recognition reliability and the second object recognition reliability are less than the predetermined second threshold, match object information of the object recognized by using the first sensing data and the second sensing data together to each of the first sensing data and the second sensing data and store the matched object information.

14. The device of claim 11, wherein the at least one processor is further configured to:
determine whether the first object recognition reliability and the second object recognition reliability are equal to or greater than a predetermined third threshold value, and
when the first object recognition reliability and the second object recognition reliability are equal to or greater than the predetermined third threshold value, perform matching and storing.

15. The device of claim 11,
wherein the object information comprises at least one of object image data of the object, identification information of the object, or position information indicating a position of the object with respect to an electronic device, and
wherein the at least one processor is further configured to match and store at least one of the object image data, the identification information, or the position information.

16. The device of claim 11, wherein the object information matched to the first sensing data is distinguished from predetermined object information previously stored in the database of the first sensor.

17. The device of claim 11, wherein the at least one processor is further configured to:
convert position information coordinates included in the object information recognized by using the second sensing data into position information coordinates for the first sensing data,
match the converted position information coordinates to the first sensing data, and
store the matched position information coordinates.

18. The device of claim 11, wherein the at least one processor is further configured to:
- obtain a difference between a sensing time of the first sensor and a sensing time of the second sensor, and
- correct the second sensing data based on the difference in the sensing time, wherein the at least one processor is further configured to:
- match object information of the object recognized by using the corrected second sensing data to the first sensing data, and
- store the matched object information.

19. The device of claim 11,
- wherein the first sensor and the second sensor are each further configured to obtain environment information indicating an environment around an electronic device,
- wherein the at least one processor is further configured to determine a weight of the first sensing data and a weight of the second sensing data based on the obtained environment information, and
- wherein the at least one processor is further configured to obtain the first object recognition reliability and the second object recognition reliability based on the determined weight of the first sensing data and the determined weight of the second sensing data respectively.

20. The device of claim 11, wherein the at least one processor is further configured to:
- estimate a whole of the object when only a part of the object is recognized based on the second sensing data, and
- correct the second sensing data based on the estimated whole of the object.

21. A non-transitory computer-readable storage medium configured to store one or more computer programs including instructions that, when executed by at least one processor, cause the at least one processor to perform the method of claim 1.

* * * * *